United States Patent
Tanaka et al.

(12) 
(10) Patent No.: US 12,104,219 B2
(45) Date of Patent: Oct. 1, 2024

(54) GRAIN-ORIENTED ELECTRICAL STEEL SHEET AND METHOD FOR MANUFACTURING SAME AND ANNEALING SEPARATOR

(71) Applicant: NIPPON STEEL CORPORATION, Tokyo (JP)

(72) Inventors: Ichiro Tanaka, Tokyo (JP); Ryutaro Yamagata, Tokyo (JP); Nobusato Morishige, Tokyo (JP); Takashi Kataoka, Tokyo (JP); Masaru Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/096,276

(22) Filed: Jan. 12, 2023

(65) Prior Publication Data
US 2023/0160034 A1    May 25, 2023

Related U.S. Application Data

(62) Division of application No. 17/421,562, filed as application No. PCT/JP2020/000339 on Jan. 8, 2020, now Pat. No. 11,591,668.

(30) Foreign Application Priority Data

Jan. 8, 2019 (JP) .................. 2019-001196

(51) Int. Cl.
| | |
|---|---|
| C21D 9/46 | (2006.01) |
| C21D 3/04 | (2006.01) |
| C21D 6/00 | (2006.01) |
| C21D 8/00 | (2006.01) |
| C21D 8/12 | (2006.01) |
| C22C 38/00 | (2006.01) |
| C22C 38/02 | (2006.01) |
| C22C 38/04 | (2006.01) |
| C22C 38/06 | (2006.01) |
| C22C 38/16 | (2006.01) |
| H01F 1/147 | (2006.01) |

(52) U.S. Cl.
CPC ............ *C21D 9/46* (2013.01); *C21D 3/04* (2013.01); *C21D 6/005* (2013.01); *C21D 6/008* (2013.01); *C21D 8/005* (2013.01); *C21D 8/1233* (2013.01); *C21D 8/1255* (2013.01); *C21D 8/1272* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/16* (2013.01); *H01F 1/147* (2013.01); *C22C 2202/02* (2013.01)

(58) Field of Classification Search
None
See application file for complete search history.

(56) References Cited

U.S. PATENT DOCUMENTS

| | | |
|---|---|---|
| 2009/0047537 A1 | 2/2009 | Nanba et al. |
| 2010/0055481 A1 | 3/2010 | Kubo et al. |
| 2013/0180634 A1 | 7/2013 | Han et al. |
| 2018/0010206 A1 | 1/2018 | Kwon et al. |
| 2019/0390350 A1 | 12/2019 | Umada et al. |
| 2020/0087746 A1 | 3/2020 | Omura et al. |

FOREIGN PATENT DOCUMENTS

| | | |
|---|---|---|
| JP | 6-88171 A | 3/1994 |
| JP | 8-269552 A | 10/1996 |
| JP | 9-249918 A | 9/1997 |
| JP | 11-302730 A | 11/1999 |
| JP | 2005-290446 A | 10/2005 |
| JP | 2011-202224 A | 10/2011 |
| JP | 2012-214902 A | 11/2012 |
| WO | WO2008/062853 A1 | 5/2008 |
| WO | WO2016/105053 A1 | 6/2016 |
| WO | WO2018/110878 A1 | 6/2018 |
| WO | WO 2018/116831 A1 | 6/2018 |

OTHER PUBLICATIONS

Machine translation of JP09-249916A. (Year: 1997).*
Machine translation of JP 2011-202224A. (Year: 2011).*
U.S. Office Action for U.S. Appl. No. 17/421,562, dated Jul. 18, 2022 (Restriction Requirement).
U.S. Office Action for U.S. Appl. No. 17/421,562, dated Nov. 21, 2022 (Notice of Allowance).

* cited by examiner

*Primary Examiner* — Xiaowei Su
(74) *Attorney, Agent, or Firm* — Birch, Stewart, Kolasch & Birch, LLP

(57) ABSTRACT

Grain-oriented electrical steel sheet excellent in magnetic properties and excellent in adhesion of a primary coating to the steel sheet is provided. The grain-oriented electrical steel sheet is provided with a base steel sheet having a chemical composition containing C: 0.005% or less, Si: 2.5 to 4.5%, Mn: 0.050 to 1.000%, a total of S and Se: 0.005% or less, sol. Al: 0.005% or less, and N: 0.005% or less and having a balance of Fe and impurities and a primary coating having $Mg_2SiO_4$ as a main constituent formed on a surface of the base steel sheet. A peak position of Al emission intensity obtained when conducting elemental analysis by glow discharge spectrometry from a surface of the primary coating in a thickness direction is present in a range of 2.0 to 12.0 μm from a surface of the primary coating to the thickness direction. A sum of perimeters of the Al oxides at the peak position of Al emission intensity is 0.20 to 1.00 μm/μm$^2$, and a number density of Al oxides is 0.02 to 0.20/μm$^2$.

2 Claims, No Drawings

GRAIN-ORIENTED ELECTRICAL STEEL SHEET AND METHOD FOR MANUFACTURING SAME AND ANNEALING SEPARATOR

CROSS-REFERENCE TO RELATED APPLICATIONS

This application is a Divisional of copending application Ser. No. 17/421,562, filed on Jul. 8, 2021, which is the National Phase under 35 U.S.C. § 371 of International Application No. PCT/JP2020/000339, filed on Jan. 8, 2020, which claims the benefit under 35 U.S.C. § 119(a) to Patent Application No. 2019-001196, filed in Japan on Jan. 8, 2019, all of which are hereby expressly incorporated by reference into the present application.

FIELD

The present invention relates to grain-oriented electrical steel sheet and a method for manufacturing the same and to an annealing separator.

BACKGROUND

Grain-oriented electrical steel sheet is steel sheet containing Si in about 0.5 to 7 mass % and having crystal orientations controlled to the {110}<001> orientation (Goss orientation). For control of the crystal orientations, the phenomenon of grain growth by secondary recrystallization is utilized.

The method for manufacturing grain-oriented electrical steel sheet is as follows: A slab is heated and hot rolled to produce hot rolled steel sheet. The hot rolled steel sheet is annealed according to need. The hot rolled steel sheet is pickled. The pickled hot rolled steel sheet is cold rolled by a cold rolling rate of 80% or more to produce cold rolled steel sheet. The cold rolled steel sheet is decarburization annealed to cause primary recrystallization. The decarburization annealed cold rolled steel sheet is finish annealed to cause secondary recrystallization. Due to the above process, grain-oriented electrical steel sheet is produced.

After the above-mentioned decarburization annealing and before the finish annealing, the surface of the cold rolled steel sheet is coated with an aqueous slurry containing an annealing separator having MgO as a main constituent and is then dried (baked). The cold rolled steel sheet with the annealing separator baked on it is taken up into a coil, then is finish annealed. At the time of finish annealing, the MgO in the annealing separator and the $SiO_2$ in the internal oxide layer formed on the surface of the cold rolled steel sheet at the time of decarburization annealing react whereby a primary coating having forsterite ($Mg_2SiO_4$) as a main constituent is formed on the surface.

After forming the primary coating, the primary coating is, for example, formed with an insulating coating (also referred to as a "secondary coating") comprised of colloidal silica and a phosphate. The primary coating and insulating coating are smaller in heat expansion coefficient than the steel sheet. For this reason, the primary coating, together with the insulating coating, imparts tension to the steel sheet to reduce the iron loss. The primary coating, furthermore, raises the adhesion of the insulating coating on the steel sheet. Therefore, the adhesion of the primary coating on the steel sheet is preferably higher.

On the other hand, lowering the iron loss of grain-oriented electrical steel sheet is effective for raising the magnetic flux density and lowering the hysteresis loss. To raise the magnetic flux density of grain-oriented electrical steel sheet, it is effective to control the crystal orientations of the base steel sheet to the Goss orientation. Art for improving integration to the Goss orientation further is described in PTLs 1 to 3. In the art described in PTLs 1 to 3, elements improving the magnetic properties which strengthen the action of the inhibitors (Sn, Sb, Bi, Te, Pb, Se, etc.) are added to the steel sheet. Due to this, integration to the Goss orientation rises and the magnetic flux density can be raised.

However, if steel sheet contains elements improving the magnetic properties, parts of the primary coating will aggregate, the interface between the steel sheet and the primary coating will easily become flattened, and the adhesion of the primary coating with the steel sheet will fall.

Art for raising the adhesion of a primary coating with a steel sheet is described in PTLs 4 and 5.

In PTL 4, addition of Ce, La, etc. to the annealing separator to thereby make the primary coating contain Ce, La, etc. in basis weights of 0.001 to 1000 $mg/m^2$ per side is described.

Furthermore, in PTL 5, control of the specific surface area of the MgO of the main constituent of the annealing separator and addition of one or more compounds of Ca, Sr, and Ba to the annealing separator to improve the coating properties are described.

CITATIONS LIST

Patent Literature

[PTL 1] Japanese Unexamined Patent Publication No. 6-88171
[PTL 2] Japanese Unexamined Patent Publication No. 8-269552
[PTL 3] Japanese Unexamined Patent Publication No. 2005-290446
[PTL 4] Japanese Unexamined Patent Publication No. 2012-214902
[PTL 5] Japanese Unexamined Patent Publication No. 11-302730

SUMMARY

Technical Problem

The inventors engaged in repeated in-depth studies to better improve the performance of grain-oriented electrical steel sheet. As a result, they learned that in grain-oriented electrical steel sheet, if, as described in PTL 4, raising the content of Ce or La in the annealing separator or, as described in PTL 5, raising the content of Ca, Sr, or Ba in the annealing separator, the coating adhesion of the grain-oriented electrical steel sheet is improved, but sometimes the magnetic properties deteriorate. Further, they learned that there are regions poor in coating adhesion in the steel sheet surface and that further improvement of the coating adhesion is being sought.

An object of the present invention is to provide grain-oriented electrical steel sheet reduced in drop in coating adhesion, excellent in magnetic properties, and excellent in adhesion of a primary coating with the steel sheet and a method for manufacturing the same and to provide an annealing separator.

Solution to Problem

The present invention is as explained below:
(1) Grain-oriented electrical steel sheet comprising a base steel sheet having a chemical composition containing, by mass %, C: 0.005% or less, Si: 2.5 to 4.5%, Mn: 0.050 to 1.000%, a total of S and Se: 0.005% or less, sol. Al: 0.005% or less, and N: 0.005% or less and having a balance of Fe and impurities and a primary coating having $Mg_2SiO_4$ as a main constituent formed on a surface of the base steel sheet,
in which grain-oriented electrical steel sheet,
a peak position of Al emission intensity obtained when conducting elemental analysis by glow discharge spectrometry from a surface of the primary coating in a thickness direction of the grain-oriented electrical steel sheet is present in a range of 2.0 to 12.0 μm from a surface of the primary coating to the thickness direction,
a sum of perimeters of Al oxides at the peak position of Al emission intensity is 0.20 to 1.00 $\mu m/\mu m^2$, and
a number density of Al oxides is 0.02 to $0.20/\mu m^2$.
(2) A method of manufacturing grain-oriented electrical steel sheet according to (1) comprising
a cold rolling process cold rolling hot rolled steel sheet having a chemical composition containing, by mass %, C: 0.100% or less, Si: 2.5 to 4.5%, Mn: 0.050 to 1.000%, a total of S and Se: 0.002 to 0.050%, sol. Al: 0.005 to 0.050%, and N: 0.001 to 0.030% and having a balance of Fe and impurities by a cold rolling rate of 80% or more to produce cold rolled steel sheet,
a decarburization annealing process decarburization annealing the cold rolled steel sheet, and
a finish annealing process coating a surface of the cold rolled steel sheet after the decarburization annealing with an aqueous slurry containing an annealing separator having MgO as a main constituent, drying the aqueous slurry on the surface of the cold rolled steel sheet in a 400 to 1000° C. furnace, then finish annealing the cold rolled steel sheet, in which
the annealing separator contains MgO, at least one of a hydroxide, sulfate, or carbonate of Ca, Sr, or Ba, and at least one of a Ti compound, Y compound, La compound, or Ce compound,
a particle size distribution of MgO is a content of particles with a particle size of 1.0 μm or less of 20 to 30 mass % and a content of particles with a particle size of 10 μm or more of 2 to 5 mass % with respect to a content of MgO,
the hydroxide, sulfate, or carbonate of Ca, Sr, or Ba is contained in a range of a total of 0.5 to 10.0 mass % with respect to a content of MgO and a value of a content of a hydroxide, sulfate, or carbonate of Ca with respect to a content of MgO divided by a molecular weight of the hydroxide, sulfate, or carbonate of Ca, a value of a content of a hydroxide, sulfate, or carbonate of Sr with respect to a content of MgO divided by a molecular weight of the hydroxide, sulfate, or carbonate of Sr, and a value of a content of a hydroxide, sulfate, or carbonate of Ba with respect to a content of MgO divided by a molecular weight of the hydroxide, sulfate, or carbonate of Ba, when respectively designated as [Ca], [Sr], and [Ba], satisfy a range of 0.80 to 1.00 of X/([Ca]+[Sr]+[Ba]),
a mean particle size of the hydroxide, sulfate, or carbonate of Ca, Sr, or Ba is 1.0 to 10.0 μm and a ratio of a mean particle size of the hydroxide, sulfate, or carbonate of Ca, Sr, or Ba to a median size of MgO is 0.8 to 2.5, and
a content of a Ti compound, Y compound, La compound, or Ce compound is a total of 1.0 to 15.0 mass % with respect to the content of MgO.
where, X means the highest value among [Ca], [Sr], or [Ba].
(3) The method for manufacturing grain-oriented electrical steel sheet according to (2), wherein a mean particle size of a hydroxide, sulfate, or carbonate of an element with the highest content in the hydroxide, sulfate, or carbonate of Ca, Sr, or Ba is 1.0 to 10.0 m.
(4) The method for manufacturing grain-oriented electrical steel sheet according to (2) or (3), wherein the hot rolled steel sheet contains one or more of Sb, Sn, and Cu in a total of 0.30 mass % or less.
(5) The method for manufacturing grain-oriented electrical steel sheet according to any one of (2) to (4), wherein the hot rolled steel sheet contains one or more of Bi, Te, and Pb in a total of 0.0300 mass % or less.
(6) An annealing separator having MgO as a main constituent, wherein
the annealing separator contains at least one of a hydroxide, sulfate, or carbonate of Ca, Sr, or Ba and at least one of a Ti compound, Y compound, La compound, or Ce compound,
a particle size distribution of MgO is a content of particles with a particle size of 1.0 μm or less of 20 to 30 mass % and a content of particles with a particle size of 10 μm or more of 2 to 5 mass % with respect to a content of MgO,
the hydroxide, sulfate, or carbonate of Ca, Sr, or Ba is contained in a range of a total of 0.5 to 10.0 mass % with respect to a content of MgO and a value of a content of a hydroxide, sulfate, or carbonate of Ca with respect to a content of MgO divided by a molecular weight of the hydroxide, sulfate, or carbonate of Ca, a value of a content of a hydroxide, sulfate, or carbonate of Sr with respect to a content of MgO divided by a molecular weight of the hydroxide, sulfate, or carbonate of Sr, and a value of a content of a hydroxide, sulfate, or carbonate of Ba with respect to a content of MgO divided by a molecular weight of the hydroxide, sulfate, or carbonate of Ba, when respectively designated as [Ca], [Sr], and [Ba], satisfy a range of 0.80 to 1.00 of X/([Ca]+[Sr]+[Ba]),
a mean particle size of the hydroxide, sulfate, or carbonate of Ca, Sr, or Ba is 1.0 to 10.0 μm and a ratio of a mean particle size of the hydroxide, sulfate, or carbonate of Ca, Sr, or Ba to a median size of MgO is 0.8 to 2.5, and
a content of a Ti compound, Y compound, La compound, or Ce compound is a total of 1.0 to 15.0 mass % with respect to the content of MgO.
where, X means the highest value among [Ca], [Sr], or [Ba].
(7) The annealing separator according to (6), wherein a mean particle size of a hydroxide, sulfate, or carbonate of an element with the highest content in the hydroxide, sulfate, or carbonate of Ca, Sr, or Ba is 1.0 to 10.0 μm.

Advantageous Effects of Invention

According to one aspect of the present invention, by reducing the size of the compound of Ca, Sr, or Ba, the roots of the primary coating are formed before the $SiO_2$ in the internal oxide layer aggregates and coarsens and anchoring structures can be made to develop at the interface of the primary coating and steel sheet. Accordingly, according to one aspect of the present invention, it is possible to reduce the drop in coating adhesion in the prior art and provide grain-oriented electrical steel sheet excellent in magnetic properties and excellent in adhesion of the primary coating with the steel sheet.

DESCRIPTION OF EMBODIMENTS

Below, the present invention will be explained along with its principles. In the following explanation, the "%" regarding the chemical composition will mean "mass %" unless otherwise indicated. Further, unless otherwise indicated, regarding the numerical values A and B, the expression "A to B" shall mean "A or more and B or less". In this expression, when only the numerical value B is assigned a unit, that unit shall also apply to the numerical value A.

1. Grain-Oriented Electrical Steel Sheet

The grain-oriented electrical steel sheet according to one aspect of the present invention is provided with a base steel sheet and a primary coating formed on the surface of the base steel sheet having forsterite ($Mg_2 SiO_4$) as its main constituent. On the primary coating, for example, there may be an insulating coating comprised of colloidal silica and a phosphate. The primary coating and insulating coating are both smaller in heat expansion coefficient than the steel sheet, so tension is imparted to the steel sheet to reduce the iron loss. If the adhesion of the primary coating is low, the secondary coating will peel off from the steel sheet together with the primary coating, so the adhesion of the primary coating with the steel sheet is preferably high.

Here, the "main constituent" means a constituent contained in 50 mass % or more with respect to a certain substance. That main constituent is contained in preferably 70 mass % or more, more preferably 90 mass % or more, with respect to a certain substance.

1.1. Chemical Composition of Base Steel Sheet

The base steel sheet forming the grain-oriented electrical steel sheet according to one aspect of the present invention contains the elements listed below. Note that, as explained in the later explained Section 2, the base steel sheet is manufactured by cold rolling, decarburization annealing, and finish annealing the hot rolled steel sheet having the later explained chemical composition. First, the essential elements will be explained.

(1) C: 0.005% or Less

C is an element effective for microstructure control up to the completion of the decarburization annealing process in the manufacturing process. However, if the content of C is over 0.005%, the magnetic properties of the finished product grain-oriented electrical steel sheet fall. Therefore, the content of C is 0.005% or less, preferably is 0.003% or less.

On the other hand, the content of C is preferably lower, but even if decreasing the content of C to less than 0.0001%, the effect of microstructure control becomes saturated and the manufacturing costs simply build up. Therefore, the content of C is preferably 0.0001% or more.

(2) Si: 2.5 to 4.5%

Si raises the electrical resistance of the steel and decreases the eddy current loss. With a content of Si of less than 2.5%, the effect of decrease of the eddy current loss is not sufficiently obtained. On the other hand, if the content of Si is over 4.5%, the cold workability of the steel falls. Therefore, the content of Si is 2.5 to 4.5%. The content of Si is preferably 2.7% or more, more preferably 2.8% or more. On the other hand, the content of Si is preferably 4.2% or less, more preferably 4.0% or less.

(3) Mn: 0.050 to 1.000%

Mn bonds with the later explained S and Se in the manufacturing process to form MnS and MnSe. These precipitates function as inhibitors (inhibitors of normal crystal growth) and, in steel, cause secondary recrystallization. Mn, furthermore, raises the hot workability of steel.

If the content of Mn is less than 0.050%, these effects cannot be sufficiently obtained. On the other hand, if the content of Mn is over 1.000%, the secondary recrystallization is not caused and the magnetic properties of the steel fall. Therefore, the content of Mn is 0.050 to 1.000%. The content of Mn is preferably 0.060% or more, more preferably 0.065% or more. On the other hand, the content of Mn is preferably 0.400% or less, more preferably 0.200% or less.

(4) Total of S and Se: 0.005% or Less

S and Se bond with Mn in the manufacturing process to form MnS and MnSe functioning as inhibitors. However, if the contents of S and Se exceed 0.005% in total, due to the remaining inhibitors, the magnetic properties will fall and due to the segregation of S and Se, surface defects will sometimes occur at the grain-oriented electrical steel sheet. Therefore, the total content of S and Se is 0.005% or less.

The total content of S and Se in the grain-oriented electrical steel sheet is preferably as low as possible. However, even if reducing the total contents of S and Se in the grain-oriented electrical steel sheet to less than 0.0001%, the manufacturing costs simply build up. Therefore, the total content of S and Se in the grain-oriented electrical steel sheet is preferably 0.0001% or more.

(5) Sol. Al: 0.005% or Less

Al bonds with N in the manufacturing process of grain-oriented electrical steel sheet to form AlN functioning as an inhibitor. However, if the content of sol. Al is over 0.005%, the inhibitor excessively remains in the base steel sheet, so the magnetic properties fall. Therefore, the content of sol. Al is 0.005% or less.

The content of sol. Al is preferably 0.004% or less, more preferably 0.003% or less. The content of sol. Al is preferably as low as possible. However, even if reducing the content of sol. Al to less than 0.0001%, the manufacturing costs simply build up. Therefore, the content of sol. Al in the grain-oriented electrical steel sheet is preferably 0.0001% or more. Note that, in this Description, sol. Al means "acid soluble Al".

(6) N: 0.005% or Less

N bonds with Al in the manufacturing process to form AlN functioning as an inhibitor. However, if the content of N is over 0.005%, the inhibitor excessively remains in the grain-oriented electrical steel sheet and the magnetic properties fall. Therefore, the content of N is 0.005% or less.

The content of N is preferably 0.004% or less, more preferably 0.003% or less. The content of N is preferably as low as possible. However, even if reducing the content of N to less than 0.0001%, the manufacturing costs will simply build up. Therefore, the content of N is preferably 0.00010% or more.

(7) Balance: Fe and Impurities

The balance of the chemical composition of the base steel sheet of the grain-oriented electrical steel sheet according to one aspect of the present invention is Fe and impurities. Here, "impurities" mean the following elements which enter from the ore used as the raw material, the scrap, or the manufacturing environment etc. when industrially manufacturing the base steel sheet and remain in the steel without being removed from the steel in the finish annealing (without the sheet being purified) and which are allowed to be contained in a content not having a detrimental effect on the action of the grain-oriented electrical steel sheet according to one aspect of the present invention.

In the impurities in the base steel sheet of the grain-oriented electrical steel sheet according to one aspect of the present invention, the total content of one or more of Sn, Sb, Cu, Bi, Te, and Pb is 0.03% or less.

These elements all raise the magnetic flux density of the grain-oriented electrical steel sheet, but are removed from the base steel sheet by the finish annealing, so all are impurities. As explained above, they are contained in a total of 0.03% or less.

1.2. Primary Coating (1) Chemical Composition

The grain-oriented electrical steel sheet according to one aspect of the present invention is provided with a primary coating. The primary coating is formed on the surface of the base steel sheet. The main constituent of the primary coating is forsterite ($Mg_2 SiO_4$).

The primary coating is formed by reaction during the finish annealing of the $SiO_2$ in the internal oxide layer formed on the surface of the steel sheet in the decarburization annealing process and MgO of the main constituent of the annealing separator coated and dried on the steel sheet before the finish annealing.

In one aspect of the present invention, at the time of manufacture of the grain-oriented electrical steel sheet, an annealing separator containing one or more of a Ti compound, Y compound, La compound, and Ce compound and, furthermore, containing one or more of a hydroxide, sulfate, or carbonate of Ca, Sr, and Ba is used. Due to this, the magnetic properties of the grain-oriented electrical steel sheet can be raised and the coating adhesion of the primary coating can also be raised.

(2) Peak Position of Al Emission Intensity by Glow Discharge Spectrometry (GDS): Within Range of 2.0 to 12.0 μm from Surface of Primary Coating in Thickness Direction The peak position of Al emission intensity obtained by elemental analysis by glow discharge spectrometry from the surface of the primary coating in the thickness direction of the grain-oriented electrical steel sheet is present within a range of 2.0 to 12.0 μm from the surface of the primary coating in the thickness direction.

In grain-oriented electrical steel sheet, there are anchoring structures at the interface of the primary coating and the steel sheet (base metal). Specifically, parts of the primary coating penetrate to the inside of the steel sheet from the surface of the steel sheet. The parts of the primary coating which penetrate to the inside of the steel sheet from the surface of the steel sheet exhibit a so-called anchor effect and raise the adhesion of the primary coating with respect to the steel sheet. After this, in this Description, the parts of the primary coating penetrating to the inside of the steel sheet from the surface of the steel sheet will be defined as "roots of the primary coating".

In the regions where the roots of the primary coating penetrate to the inside of the steel sheet, the main constituent of the roots of the primary coating is spinel ($MgAl_2O_4$)—one type of Al oxide. The peak of the Al emission intensity obtained when performing elemental analysis by glow discharge spectrometry shows the position where the spinel is present.

The depth position of the peak of Al emission intensity from the surface of the primary coating is defined as the "Al peak position $D_{Al}$" (μm). An Al peak position $D_{Al}$ of less than 2.0 μm means that spinel is formed at a shallow position from the surface of the steel sheet, that is, the roots of the primary coating are shallow. In this case, the adhesion of the primary coating is low. On the other hand, an Al peak position $D_{Al}$ of over 12.0 μm means that the roots of the primary coating have excessively developed. The roots of the primary coating penetrate down to deep parts inside of the steel sheet. In this case, the roots of the primary coating obstruct domain wall movement and the magnetic properties fall.

If the Al peak position $D_{Al}$ is 2.0 to 12.0 μm, excellent magnetic properties can be maintained while the adhesion of the primary coating can be raised. The Al peak position $D_{Al}$ is preferably 3.0 μm or more, more preferably 4.0 μm or more. On the other hand, the Al peak position $D_{Al}$ is preferably 11.0 μm or less, more preferably 10.0 μm or less.

The Al peak position $D_{Al}$ is measured by the following method. Known glow discharge spectrometry (GDS) is used for elemental analysis. Specifically, the space above the surface of the grain-oriented electrical steel sheet is made an Ar atmosphere. Voltage is applied to the grain-oriented electrical steel sheet to cause generation of glow plasma which is used to sputter the surface layer of the steel sheet while analyzing it in the thickness direction. The Al contained in the surface layer of the steel sheet is identified based on the emission spectrum wavelength distinctive to the element generated by excitation of atoms in the glow plasma. Furthermore, the identified Al emission intensity is plotted in the depth direction. The Al peak position $D_{Al}$ is found based on the plotted Al emission intensity.

The depth position from the surface of the primary coating in the elemental analysis is calculated based on the sputter time. Specifically, in a standard sample, the relationship between the sputter time and the sputter depth (below, referred to as the "sample results") is found in advance. The sample results are used to convert the sputter time to the sputter depth. The converted sputter depth is defined as the depth position found by the elemental analysis (Al analysis) (depth position from surface of primary coating). In the GDS in this disclosure, it is possible to use a commercially available high frequency glow discharge optical emission analysis apparatus.

(3) Sum of Perimeters of Al Oxides at Peak Position of Al Emission Intensity: 0.20 to 1.00 μm/μm$^2$ In the grain-oriented electrical steel sheet according to one aspect of the present invention, furthermore, the sum of perimeters of Al oxides at the Al peak position $D_{Al}$ is 0.20 to 1.00 μm/μm$^2$.

As explained above, the Al peak position $D_{Al}$ corresponds to the parts of the roots of the primary coating. At the roots of the primary coating, there are large amounts of the Al oxide spinel ($MgAl_2O_4$) present. Therefore, sum of perimeters of Al oxides at any region of the Al peak position $D_{Al}$ (for example, the bottom parts of discharge marks of the glow discharge) is an indicator showing the spread of the roots of the primary coating (spinel).

If the sum of perimeters of Al oxides is less than 0.20 μm/μm$^2$, the roots of the primary coating are not sufficiently formed. For this reason, the adhesion of the primary coating with respect to the steel sheet is low. On the other hand, if the sum of perimeters of Al oxides is over 1.00 μm/μm$^2$, the roots of the primary coating become excessively developed and the roots of the primary coating penetrate down to the deep parts inside of the steel sheet, so the roots of the primary coating obstruct the secondary recrystallization and domain wall movement and the magnetic properties fall. Therefore, the sum of perimeters of Al oxides is 0.20 to 1.00 μm/m$^2$.

The sum of perimeters of Al oxides is preferably 0.25 $\mu m/\mu m^2$ or more, more preferably 0.27 $\mu m/\mu m^2$ or more. On the other hand, the sum of perimeters of Al oxides is preferably 0.98 $\mu m/\mu m^2$ or less, more preferably 0.95 $\mu m/\mu m^2$ or less.

The sum of perimeters of Al oxides can be found by the following method: Using a glow discharge optical emission analysis apparatus, glow discharge is performed down to the Al peak position $D_{Al}$. In the discharge marks at the Al peak position $D_{Al}$, any 36 $\mu m \times 50$ $\mu m$ region (observed region) is analyzed for elements by an energy dispersive X-ray spectrometer (EDS) and the Al oxides in the observed region are identified. Specifically, regions in which the intensity of the characteristic X-rays of O is 50% or more with respect to the maximum intensity of the characteristic X-rays of O in the observed region of the oxides are identified as oxides. The identified Al oxides are mainly spinel. In addition, there is possibility of their being silicates containing various alkali earth metals and Al in a high concentration. From the shapes of the Al oxides identified in the analysis results of EDS image data, the respective perimeters ($\mu m$) are calculated. Based on this, the sum of perimeters of Al oxides ($\mu m$) per unit area ($\mu m^2$) of the observed region (unit: $\mu m/\mu m^2$) is found. In this way, the sum of perimeters of Al oxides in the present disclosure means the sum of perimeters of Al oxides per unit area of the observed region.

(4) Number Density of Al Oxides: 0.02 to 0.20/$\mu m^2$

In the grain-oriented electrical steel sheet according to one aspect of the present invention, furthermore, the number density of Al oxides at the Al peak position $D_{Al}$ is 0.02 to 0.20/$\mu m^2$.

As explained above, the Al peak position $D_{Al}$ corresponds to the roots of the primary coating. At the roots of the primary coating, there is a large amount of the Al oxide spinel ($MgAl_2O_4$) present. Therefore, if defining the number density of Al oxides at any region at the Al peak position $D_{Al}$ (for example, the bottom parts of discharge marks of the glow discharge) as the Al oxide number density ND, the Al oxide number density ND becomes an indicator showing the dispersed state of roots of the primary coating (spinel) at the surface layer of the steel sheet.

If the Al oxide number density ND is less than 0.02/$\mu m^2$, the roots of the primary coating are not sufficiently formed, so the adhesion of the primary coating with respect to the steel sheet is low. On the other hand, if the Al oxide number density ND is over 0.20/$\mu m^2$, the roots of the primary coating excessively develop and the roots of the primary coating penetrate down to deep parts inside of the steel sheet. The roots of the primary coating obstruct the secondary recrystallization and domain wall movement, so the magnetic properties fall. Therefore, the Al oxide number density ND is 0.02 to 0.20/$\mu m^2$.

The Al oxide number density ND is preferably 0.025/$\mu m^2$ or more. On the other hand, the Al oxide number density ND is preferably 0.18/$\mu m^2$ or less, more preferably 0.15/$\mu m^2$ or less.

The Al oxide number density ND can be found by the following method: A glow discharge optical emission analysis apparatus is used for glow discharge down to the Al peak position $D_{Al}$. Any 36 $\mu m \times 50$ $\mu m$ region (observed region) in the discharge marks at the Al peak position $D_{Al}$ is analyzed for elements by an energy dispersive type X-ray spectroscope (EDS) to identify the Al oxides in the observed region.

Specifically, a region in which the intensity of the characteristic X-rays of O is 50% or more with respect to the maximum intensity of the characteristic X-rays of O in the observed region is identified as an oxide. In the identified oxide regions, a region in which the intensity of the characteristic X-rays of Al is 30% or more with respect to the maximum intensity of the characteristic X-rays of Al in the observed region is identified as an Al oxide.

The identified Al oxides are mainly spinel. In addition, there is possibility of their being silicates containing various alkali earth metals and Al in a high concentration. The number of the identified Al oxides are counted and the Al oxide number density ND (/$\mu m^2$) is found as ND=number of identified Al oxides/area of observed region.

2. Method for Manufacturing Grain-Oriented Electrical Steel Sheet

The above-mentioned grain-oriented electrical steel sheet can, for example, be manufactured by the method of manufacture of grain-oriented electrical steel sheet according to one aspect of the present invention.

The method of manufacture according to one aspect of the present invention includes a cold rolling process, decarburization process, and finish annealing process. Below, the processes will be successively explained.

(1) Cold Rolling Process

In the cold rolling process, hot rolled steel sheet having a chemical composition containing one or more of C: 0.100% or less, Si: 2.5 to 4.5%, Mn: 0.050 to 1.000%, S and Se: total of 0.002 to 0.050%, sol. Al: 0.005 to 0.050%, and N: 0.001 to 0.030% as essential elements, containing one or both of one or more of Sb, Sn, and Cu: total of 0.30% or less and one or more of Bi, Te, and Pb: total of 0.0300% or less as optional elements, and having a balance of Fe and impurities is cold rolled by a cold rolling rate of 80% or more to manufacture cold rolled steel sheet. The reasons for limitation of the chemical composition of the hot rolled steel sheet will be explained.

(1-1) Chemical Composition of Hot Rolled Steel Sheet

First, the essential elements will be explained.

(1-1-1) C: 0.100% or Less

If the content of C of the hot rolled steel sheet is over 0.100%, the time required for the decarburization annealing becomes longer, the manufacturing costs build up, and the productivity also falls. Therefore, the content of C of the hot rolled steel sheet is 0.100% or less. The content of C of the hot rolled steel sheet is preferably 0.080% or less, more preferably 0.070% or less.

(1-1-2) Si: 2.5 to 4.5%

As explained in the above section on the chemical composition of the grain-oriented electrical steel sheet, Si raises the electrical resistance of steel, but if contained in excess, the cold workability falls. If the content of Si is 2.5 to 4.5%, the content of Si of the grain-oriented electrical steel sheet after the finish annealing process becomes 2.5 to 4.5%.

(1-1-3) Mn: 0.050 to 1.000%

As explained in the above section on the chemical composition of the grain-oriented electrical steel sheet, in the manufacturing process, Mn bonds with S and Se to form precipitates functioning as inhibitors. Mn further raises the hot workability of steel. If the content of Mn of the hot rolled steel sheet is 0.050 to 1.000%, the content of Mn of the grain-oriented electrical steel sheet after the finish annealing process becomes 0.050 to 1.000%.

(1-1-4) Total of S and Se: 0.002 to 0.050%

In the manufacturing process, S and Se bond with Mn to form MnS and MnSe. MnS and MnSe both function as the inhibitors required for suppressing crystal grain growth during the secondary recrystallization.

If the total content of S and Se is less than 0.002%, the effect of formation of MnS and MnSe is difficult to obtain. On the other hand, if the total content of S and Se is over 0.050%, in the manufacturing process, secondary recrystallization does not occur and the magnetic properties of the steel fall.

Therefore, the total content of S and Se is 0.002 to 0.050%. The total content of S and Se is preferably 0.040% or less, more preferably 0.030% or less.

(1-1-5) Sol. Al: 0.005 to 0.050%

In the manufacturing process, Al bonds with N to form AlN. AlN functions as an inhibitor. If the content of sol. Al is less than 0.005%, the effect of bonding with N to form AlN is not obtained. On the other hand, if the content of sol. Al of the hot rolled steel sheet is over 0.050%, the AlN coarsens and it becomes difficult for the AlN to function as an inhibitor, so sometimes secondary recrystallization does not occur.

Therefore, the content of sol. Al of the hot rolled steel sheet is 0.005 to 0.050%. The content of sol. Al is preferably 0.040% or less, more preferably 0.030% or less. On the other hand, the content of sol. Al is preferably 0.010% or more, more preferably 0.020% or more.

(1-1-6) N: 0.001 to 0.030%

In the manufacturing process, N bonds with Al to form AlN functioning as an inhibitor. If the content of N is less than 0.001%, this effect is not obtained. On the other hand, if the content of N is over 0.030%, the AlN coarsens and it becomes difficult for the AlN to function as an inhibitor so sometimes secondary recrystallization does not occur.

Therefore, the content of N is 0.001 to 0.030%. The content of N is preferably 0.012% or less, more preferably 0.010% or less. On the other hand, the content of N is preferably 0.005% or more, more preferably 0.006% or more.

Next, the optional elements will be explained.

(1-1-7) One or More of Sb, Sn, and Cu: Total of 0.30% or Less

The hot rolled steel sheet may further contain one or more of Sb, Sn, and Cu as optional elements in a total of 0.30% or less.

Sb, Sn, and Cu are all optional elements contained in accordance with need. If contained, Sb, Sn, and Cu all raise the magnetic flux density of grain-oriented electrical steel sheet. If Sb, Sn, or Cu is contained in even a small amount, the magnetic flux density is raised.

However, if the total content of Sb, Sn, and Cu is over 0.30%, at the time of the decarburization annealing, it becomes difficult for an internal oxide layer to be formed and, at the time of the finish annealing, the formation of the primary coating, which proceeds with the reaction of MgO of the annealing separator and the $SiO_2$ of the internal oxide layer, is delayed, so the adhesion of the primary coating formed falls.

Therefore, the total content of Sb, Sn, and Cu is 0.00 to 0.30%. The total content of Sb, Sn, and Cu is preferably 0.005% or more, more preferably 0.007% or more. On the other hand, the total content of Sb, Sn, and Cu is preferably 0.25% or less, more preferably 0.20% or less.

(1-1-8) One or More of Bi, Te, and Pb: Total of 0.0300% or Less

The hot rolled steel sheet may further contain one or more of Bi, Te, and Pb as optional elements in a total of 0.0300% or less.

Bi, Te, and Pb are all optional elements and need not be contained. By including one or more of these elements, the magnetic flux density of the grain-oriented electrical steel sheet can be raised more.

However, if the total content of these elements is over 0.0300%, at the time of finish annealing, these elements segregate at the surface and the interface of the primary coating and steel sheet becomes flattened, so the coating adhesion of the primary coating falls.

Therefore, the total content of the one or more of Bi, Te, and Pb is 0.0000 to 0.0300%. The total content of the one or more of Bi, Te, and Pb is preferably 0.0005% or more, more preferably 0.0010% or more.

(1-1-9) Balance: Fe and Impurities

The balance of the chemical composition of the hot rolled steel sheet is Fe and impurities. Here, "impurities" mean the elements which enter from the ore used as the raw material, the scrap, or the manufacturing environment etc. when industrially manufacturing hot rolled steel sheet and which are allowed to be contained in a range not having a detrimental effect on the action of the grain-oriented electrical steel sheet according to one aspect of the present invention.

(1-2) Method of Manufacturing Hot Rolled Steel Sheet

The hot rolled steel sheet having the above-mentioned chemical composition is manufactured by a known method. One example of the method of manufacturing the hot rolled steel sheet is as follows. A slab having a chemical composition the same as the above-mentioned hot rolled steel sheet is prepared. The slab is manufactured through a known refining process and casting process.

The slab is heated. The heating temperature of the slab is, for example, over 1280° C. to 1350° C. or less. The heated slab is hot rolled to manufacture the hot rolled steel sheet.

(1-3) Conditions of Cold Rolling

The prepared hot rolled steel sheet is cold rolled to produce the cold rolled steel sheet of the base steel sheet. The cold rolling may be performed only one time or may be performed several times. If performing cold rolling several times, after performing cold rolling, process annealing is performed for purpose of softening the steel, then cold rolling is performed. By performing cold rolling one time or several times, cold rolled steel sheet having the finished product thickness (thickness of finished product) is manufactured.

The cold rolling rate in the one time or several times of cold rolling is 80% or more. Here, the cold rolling rate (%) is defined as follows:

Cold rolling rate (%)={1−(thickness of cold rolled steel sheet after final cold rolling)/(thickness of hot rolled steel sheet before start of initial cold rolling)}×100

Note that, the cold rolling rate is preferably 95% or less. Further, before cold rolling the hot rolled steel sheet, the hot rolled steel sheet may be heat treated or may be pickled.

(2) Decarburization Annealing Process

In the decarburization process, the cold rolled steel sheet obtained through the cold rolling process is treated by decarburization annealing.

The steel sheet manufactured by the cold rolling process is treated by decarburization annealing and if necessary is treated by nitridation annealing. The decarburization annealing is performed in a known hydrogen-nitrogen-containing wet atmosphere. Due to the decarburization annealing, the C concentration of the grain-oriented electrical steel sheet is reduced to 50 ppm or less.

In the decarburization annealing, primary recrystallization occurs at the steel sheet and the working strain introduced due to the cold rolling process is relieved. Furthermore, in the decarburization annealing process, an internal oxide layer having $SiO_2$ as its main constituent is formed at the surface layer part of the steel sheet. The annealing temperature in the decarburization annealing is known. For example, it is 750 to 950° C. The holding time at the annealing temperature is, for example, 1 to 5 minutes.

(3) Finish Annealing Process

The steel sheet after the decarburization annealing process is finish annealed. In the finish annealing process, first, the cold rolled steel sheet after the decarburization annealing is coated with an aqueous slurry containing the annealing separator. The aqueous slurry on the surface of the cold rolled steel sheet is dried in a 400 to 1000° C. furnace. The steel sheet on which the aqueous slurry was coated and dried is then annealed (finish annealing).

(3-1) Aqueous Slurry

The aqueous slurry is produced by adding water (typically pure water for industrial use) to the annealing separator explained later and stirring them. The ratio of the annealing separator and water may be determined so as to give the required coating amount at the time of coating by a roll coater. For example, the ratio of water to the annealing separator is preferably, by mass, 2 times or more and 20 times or less. If the ratio of water to the annealing separator is 2 times or more, the aqueous slurry will not become too high in viscosity and the annealing separator can be uniformly coated on the surface of the steel sheet, so this is preferable. If the ratio of the water to the annealing separator is 20 times or less, in the succeeding drying process, the aqueous slurry will not become insufficiently dried and the primary coating will not easily deteriorate in appearance due to the additional oxidation of the steel sheet by water content remaining in the finish annealing, so this is preferable.

(3-2) Annealing Separator According to One Aspect of Present Invention

The annealing separator according to one aspect of the present invention used in the finish annealing process has MgO as its main constituent. The amount of deposition of the annealing separator on the steel sheet is, per surface, for example, preferably 2 g/m$^2$ or more and 10 g/m$^2$ or less. If the amount of deposition of the annealing separator on the steel sheet is 2 g/m$^2$ or more, in the finish annealing, it will become difficult for steel sheets to stick to each other, so this is preferable. If the amount of deposition of the annealing separator on the steel sheet is 10 g/m$^2$ or less, the manufacturing costs will not increase, so this is preferable.

Below, the annealing separator according to one aspect of the present invention will be explained. Note that, the particle size distribution of MgO, the median size of MgO, and the mean particle size of a hydroxide, sulfate, or carbonate of Ca, Sr, or Ba (that is, the volume mean diameter MV) explained in the present disclosure are values based on volume measured by the laser diffraction/scattering method in accordance with JIS Z8825 (2013). Therefore, the respective contents of the particles with a particle size of 1.0 μm or less and the particles with a particle size of 10 μm or more of MgO are the above values based on volume expressed based on mass.

(3-2-1) Particle Size Distribution of MgO

The MgO of the main constituent of the annealing separator has the following particle size distribution. The content of particles with a particle size of 1.0 μm or less is 20 to 30% with respect to the content of MgO contained in the annealing separator and the content of particles with a particle size of 10 μm or more is 2 to 5%.

(3-2-2) Hydroxide, Sulfate, or Carbonate of Ca, Sr, or Ba

The annealing separator contains one or more of a hydroxide, sulfate, or carbonate of Ca, Sr, and Ba. The content of the hydroxide, sulfate, or carbonate of Ca, Sr, and Ba is a total of 0.5 to 10.0% with respect to the content of MgO contained in the annealing separator. That amount, for example, may also be 1.0% or more, 1.5% or more, or 2.0% or more. For example, it may be 9.5% or less, 9.0% or less, or 8.5% or less. Furthermore, when expressing a value of a content of a hydroxide, sulfate, or carbonate of Ca with respect to the content of MgO divided by a molecular weight of the hydroxide, sulfate, or carbonate of Ca, a value of a content of a hydroxide, sulfate, or carbonate of Sr with respect to the content of MgO divided by a molecular weight of the hydroxide, sulfate, or carbonate of Sr, and a value of a content of a hydroxide, sulfate, or carbonate of Ba with respect to the content of MgO divided by a molecular weight of the hydroxide, sulfate, or carbonate of Ba as [Ca], [Sr], and [Ba], the annealing separator satisfies X/([Ca]+[Sr]+[Ba]): 0.80 to 1.00 in range. Here, X means the highest value among [Ca], [Sr], or [Ba]. X/([Ca]+[Sr]+[Ba]), for example, may be 0.85 or more, 0.90 or more, or 0.95 or more.

(3-2-3) Mean Particle Size of Hydroxide, Sulfate, or Carbonate of Ca, Sr, or Ba

The mean particle size of a hydroxide, sulfate, or carbonate of Ca, Sr, or Ba is, in one aspect, 1.0 to 10.0 μm. The mean particle size may, for example, be 1.5 μm or more, 2.0 μm or more, or 2.5 μm or more and may, for example, be 8.0 μm or less, 6.0 μm or less, or 5.0 μm or less. In one aspect, the mean particle size of the compound of the element with the highest content among Ca, Sr, or Ba (that is, the content based on mass) is preferably in the above range.

In one aspect, the mean particle size of the compounds contained in the annealing separator as a whole among Ca hydroxide, Ca sulfate, Ca carbonate, Sr hydroxide, Sr sulfate, Sr carbonate, Ba hydroxide, Ba sulfate, and Ba carbonate is in the above range.

(3-2-4) Ratio of Mean Particle Size of Hydroxide, Sulfate, or Carbonate of Ca, Sr, or Ba with Respect to Median Size of MgO The ratio of the mean particle size of a hydroxide, sulfate, or carbonate of Ca, Sr, or Ba with respect to the median size of MgO (particle size corresponding to center value of particle size distribution) is, in one aspect, 0.8 to 2.5. This ratio may, for example, be 1.0 or more or 1.1 or more and may, for example, be 2.3 or less or 2.0 or less.

In one aspect, the ratio, with respect to the median size of MgO, of the mean particle size of the compounds contained in the annealing separator as a whole in the Ca hydroxide, Ca sulfate, Ca carbonate, Sr hydroxide, Sr sulfate, Sr carbonate, Ba hydroxide, Ba sulfate, and Ba carbonate is in the above range.

The median size of MgO (that is, the $D_{50}$ particle size) may, in one aspect, be 1.50 μm or more, 1.80 μm or more, or 2.00 μm or more and may, in one aspect, be 5.00 μm or less or 3.00 μm or less.

(3-2-5) Ti Compound, Y Compound, La Compound, or Ce Compound

The annealing separator contains one or more of a Ti compound, Y compound, La compound, and Ce compound. The content of the Ti compound, Y compound, La compound, and Ce compound is a total of 1.0 to 15.0% with respect to the content of MgO contained in the annealing separator. The above amount may, for example, be 1.5% or more, 2.0% or more, or 2.5% or more and may, for example, be 14.0% or less, 13.5% or less, or 13.0% or less.

Here, the Ti compound, Y compound, La compound, or Ce compound is preferably an oxide or hydroxide.

The reasons for these conditions will be explained next. There are anchoring structures at the interface of the primary coating and steel sheet of the grain-oriented electrical steel sheet. Specifically, near the interface of the primary coating and steel sheet, the roots of the primary coating spread down to the inside of the steel sheet. The more the roots of the primary coating penetrate to the inside of the steel sheet, the higher the adhesion of the primary coating to the steel sheet. Furthermore, the more dispersed the roots of the primary coating inside the steel sheet (the more they are spread), the higher the adhesion of the primary coating to the steel sheet.

However, if the roots of the primary coating penetrate to the inside of the steel sheet too much or if the roots of the primary coating are excessively dispersed inside of the steel sheet, the roots of the primary coating will obstruct the secondary recrystallization in the Goss orientation and crystal grains with random orientations will increase at the surface layer. Furthermore, the roots of the primary coating become factors inhibiting domain wall movement and the magnetic properties deteriorate.

The drop in adhesion of the primary coating in the prior art is due to the aggregation of the roots of the primary coating causing the interfacial structures between the steel sheet and primary coating to be flattened. For this reason, addition of a compound of Ce, La, etc. or addition of a compound of Ca, Sr, or Ba, to the annealing separator can improve the coating adhesion.

However, if adding a compound of Ce, La, etc. or a compound of Ca, Sr, or Ba in a large amount, sometimes the magnetic properties deteriorate. Further, even if adding these compounds, sometimes differences arise in the coating adhesion.

The inventors engaged in intensive studies for improving the coating adhesion and a result discovered that if adding compounds of Ca, Sr, or Ba combined, rather the formation of the coating is obstructed and that for improvement of the adhesion of the primary coating, reduction of the size of the compounds of Ca, Sr, or Ba would be effective.

Further, not only does the MgO of the main constituent of the annealing separator have to be comprised of fine particles contributing to the formation of the primary coating, but also importantly has to have a specific particle size distribution including also larger size particles having an effect on the shape of the steel sheet after finish annealing. It was learned that to obtain the effect of improvement of the coating adhesion by reduction of the size of the compound of Ca, Sr, or Ba, the ratio of the median size of MgO and the mean particle size of the compound of Ca, Sr, or Ba is important.

Note that, in PTLs 4 and 5, improvement of the coating adhesion by reduction of the size of the compounds of Ca, Sr, or Ba added to the annealing separator and control of the particle size with MgO is not described or suggested.

Here, the main constituent of the roots of the primary coating is spinel ($MgAl_2O_4$), so the position of the peak of Al emission intensity in the thickness direction obtained by glow discharge spectrometry (GDS) corresponds to the position of presence of the spinel, that is, the depth of the roots of the primary coating.

Further, the distribution of elements at the position of the peak of Al emission intensity corresponds to the distribution of elements at the position of the roots of the primary coating while the state of dispersion of Al corresponds to the state of dispersion of the spinel, that is, the state of dispersion of the roots of the primary coating.

The inventors investigated the microstructure of the primary coating of the grain-oriented electrical steel sheet obtained under conditions of different sizes of the compound of Ca, Sr, or Ba by the above techniques and obtained the new discovery that by reduction of the size of the compound of Ca, Sr, or Ba, the number density of Al oxides and sum of the perimeters at the position of the peak of Al emission intensity increase, that is, by reduction of the size of the compound of Ca, Sr, or Ba, the roots of the primary coating develop.

Ca, Sr, and Ba are faster in dispersion in $SiO_2$ than Mg. For this reason, it is surmised that if a compound of Ca, Sr, or Ba is added to the annealing separator, it reacts with these elements and forms stable oxides at a low oxygen potential in the inside layer before the $SiO_2$ in the internal oxide layer aggregates and coarsens.

Due to the formation of these stable oxides, flattening of the interfacial structures between the steel sheet and the primary coating is suppressed and the roots of the primary coating develop. Reduction of the size of the compound of Ca, Sr, or Ba and control of the particle size with the MgO of the main constituent of the annealing separator are surmised to enhance the effect of formation of the roots of the primary coating through increase of the frequency of contact with the $SiO_2$ of the surface of the steel sheet and the compound of Ca, Sr, or Ba and contribute to improvement of the coating adhesion. If adding compounds of Ca, Sr, or Ba combined, the state of deposition on the steel sheet becomes uneven and it is believed that formation of the primary coating is easily obstructed.

That is, if the mean particle size of the hydroxide, sulfate, or carbonate of Ca, Sr, or Ba is less than 1.0 μm or over 10 μm, flattening of the interfacial structures between the steel sheet and the primary coating cannot be sufficient suppressed and the roots of the primary coating are liable to not sufficiently develop. For this reason, the mean particle size of the hydroxide, sulfate, or carbonate of Ca, Sr, or Ba is preferably 1.0 to 10.0 μm. In one aspect, the mean particle size of the compound of the element with the highest content (that is, the content based on mass) among Ca, Sr, and Ba is preferably 1.0 to 10.0 μm.

Note that, the additives added to the annealing separator also have an effect on the inhibitors required and indispensible for development of Goss orientations by secondary recrystallization. The compound of Ca, Sr, or Ba causes the development of the roots of the primary coating through the formation of oxides at the surface layer. A change in the behavior of formation of the oxides at the surface layer has a great effect on the behavior of change of the inhibitors in the finish annealing as well and tends to destabilize the magnetic properties.

By combined addition of a Ti compound, Y compound, La compound, and Ce compound, both the improvement of coating adhesion due to reduction of the size of the Ca, Sr, or Ba compound and excellent magnetic properties can be achieved.

If the total content of the one or more of a hydroxide, sulfate, or carbonate of Ca, Sr, and Ba is less than 0.5% with respect to the content of MgO, the roots of the primary coating will not develop and the adhesion will become poor, while if over 10.0%, the formation of the primary coating is suppressed and as a result the adhesion is also poor.

Further, if X/([Ca]+[Sr]+[Ba]) (where, X is the highest value among [Ca], [Sr], and [Ba]) is less than 0.80, the primary coating becomes unevenly formed and the adhesion also becomes poor.

Furthermore, if the total content of the one or more of the Ti compound, Y compound, La compound, and Ce compound is less than 1.0% with respect to the total of MgO, the roots of the primary coating will not develop so the adhesion will be poor and, further, the magnetic properties will also be poor, while if over 15.0%, the roots of the primary coating will be formed, but the magnetic properties will be poor.

MgO has a particle size distribution of a content of particles with a particle size of 1.0 m or less, by mass, of 20 to 30% and a content of particles with a particle size of 10 μm or more, by mass, of 2 to 5%. The ratio of the mean particle size of a hydroxide, sulfate, or carbonate of Ca, Sr, or Ba with respect to the median size of MgO is 0.8 to 2.5.

The MgO of the main constituent of the annealing separator has to be fine particles contributing to the formation of the primary coating. If the content of particles with a particle size of 1.0 μm or less is less than 20%, the primary coating is insufficiently formed. On the other hand, if over 30%, the reflectivity becomes excessively high and there is a detrimental effect on the shape of the steel sheet and the workability at the time of coating it. Furthermore, sometimes the magnetic properties and coating adhesion are detrimentally affected. Further, even if there are few coarse particles, the shape of the steel sheet is detrimentally affected, while if they are excessively numerous, the formation of the primary coating is detrimentally affected. For this reason, the content of particles with a particle size of 10 μm or more is 2 to 5%.

In MgO having such a particle size distribution, the median size where the large side and small side become equal amounts being equal to the mean particle size of the hydroxide, sulfate, or carbonate of Ca, Sr, or Ba of the additives to the annealing separator leads to an increase in the frequency of contact between the surface of the steel sheet after coating and baking of the annealing separator with the compound of Ca, Sr, or Ba. The median size reflects the size of typical particles in the group of particles (that is, particles in cumulative volume 50%), while the mean particle size reflects the size of the particles as a whole present in the group of particles. The frequency of contact of the surface of the steel sheet with the compound of Ca, Sr, or Ba can be governed by the surface area of the compound of Ca, Sr, or Ba, so control of the mean particle size of the compound of Ca, Sr, or Ba can be advantageous for increase of the frequency of contact. The powder of the additive forms secondary particles aggregated with each other. If considered by the particle size of the secondary particles, by the ratio of the mean particle size of the hydroxide, sulfate, or carbonate of Ca, Sr, or Ba with respect to the median particle size of MgO being 0.8 to 2.5, the effect of forming the roots of the primary coating is enhanced and the coating adhesion is improved.

Here, in the hydroxide, sulfate, or carbonate of Ca, Sr, or Ba, the hydroxide of Sr and the hydroxide and carbonate of Ba are no different in effect of the invention, but they easily are spoiled during handling, so care is required in management. There is a concern over productivity being harmed. For this reason, unless there is a particular reason otherwise, there is no need to deliberately use these.

Control of the particle size distribution in the annealing separator is not limited to this, but for example this can be realized by a person skilled in the art using known means to mix MgO having a desired particle size distribution, a hydroxide, sulfate, or carbonate of Ca, Sr, or Ba having a desired particle size distribution (alone or in a mixture of two or more types), and a liquid medium (for example water). In one aspect, the value of the present disclosure relating to the particle size distribution may also be a value of the particles used for preparing the annealing separator.

(3-2-6) Manufacturing Conditions of Finish Annealing Process

The finish annealing process is for example performed under the following conditions: The baking treatment is performed before the finish annealing. First, the surface of the steel sheet is coated with the aqueous slurry annealing separator. The steel sheet coated on the surface with the annealing separator is loaded into a furnace held at 400 to 1000° C. and held there (baking treatment). Due to this, the annealing separator coated on the surface of the steel sheet is dried. The holding time is for example 10 to 90 seconds.

After the annealing separator is dried, the finish annealing is performed. In the finish annealing, the annealing temperature is made for example 1150 to 1250° C. and the base steel sheet (the steel sheet on which the annealing separator is coated and made to dry) is soaked. The soaking time is for example 15 to 30 hours. The internal furnace atmosphere in the finish annealing is a known atmosphere.

In the grain-oriented electrical steel sheet produced by the above manufacturing process, a primary coating containing $Mg_2SiO_4$ as its main constituent is formed. The Al peak position $D_{Al}$ is present in the range of 2.0 to 12.0 μm from the surface of the primary coating in the thickness direction. The sum of the perimeters of the Al oxides at the Al peak position $D_{Al}$ is 0.20 to 1.00 μm/μm². Furthermore, the Al oxide number density ND is 0.02 to 0.20/μm².

Due to the decarburization annealing process and finish annealing process, the elements of the chemical composition of the hot rolled steel sheet are removed to a certain extent from the steel constituents. In particular, the S, Al, N, etc. functioning as inhibitors are greatly removed at the finish annealing process. For this reason, compared with the chemical composition of the hot rolled steel sheet, the above contents of elements in the chemical composition of the base steel sheet of the grain-oriented electrical steel sheet become lower as explained above. If using the hot rolled steel sheet of the above-mentioned chemical composition to perform the above method of manufacture, a grain-oriented electrical steel sheet having the base steel sheet of the above chemical composition can be produced.

(4) Secondary Coating Forming Process

In one example of the method for manufacturing a grain-oriented electrical steel sheet according to one aspect of the present invention, furthermore, after the finish annealing process, a secondary coating forming process may be undergone. In the secondary coating forming process, the surface of the grain-oriented electrical steel sheet after lowering the temperature in the finish annealing is coated with an insulating coating agent mainly comprised of colloidal silica and a phosphate, then is baked. Due to this, a secondary coating of a tension insulating coating is formed on the primary coating.

(5) Magnetic Domain Refining Treatment Process

The grain-oriented electrical steel sheet according to one aspect of the present invention may be subjected to a process for treatment to refine the magnetic domains after the finish annealing process or secondary coating forming process. In the magnetic domain refining treatment process, the surface of the grain-oriented electrical steel sheet is scanned by a laser beam having a magnetic domain refining effect or grooves are formed at the surface. In this case, grain-oriented electrical steel sheet with further excellent magnetic properties can be manufactured.

EXAMPLES

The present invention will be explained more specifically by examples.

Molten steel having each of the chemical compositions shown in Table 1 was produced by a vacuum melting furnace. The molten steel produced was used to manufacture a slab. The slab was heated at 1350° C. for 1 hour and the heated slab was hot rolled to manufacture hot rolled steel sheet having a thickness of 2.3 mm. The chemical composition of the hot rolled steel sheet was the same as the molten steel and was as indicated in Table 1. Note that, in Tables 1 and 2, "-" indicates not contained.

The hot rolled steel sheet was treated to anneal it under conditions of 1100° C. of 120 seconds, then the hot rolled steel sheet was pickled. The annealing treatment conditions and pickling conditions of the hot rolled steel sheet were made the same in each of the hot rolled steel sheets. The

TABLE 1

| Test no. | C | Si | Mn | S | Se | S + Se | sol. Al | N | Sb | Sn | Cu | Sb + Sn + Cu | Bi | Te | Pb | Bi + Te + Pb |
|---|---|---|---|---|---|---|---|---|---|---|---|---|---|---|---|---|
| 1 | 0.079 | 3.3 | 0.080 | 0.022 | 0.001 | 0.023 | 0.025 | 0.008 | — | — | — | — | — | — | — | — |
| 2 | 0.078 | 3.5 | 0.077 | 0.001 | 0.018 | 0.019 | 0.026 | 0.009 | 0.08 | — | — | 0.08 | — | — | — | — |
| 3 | 0.079 | 3.2 | 0.080 | 0.019 | 0.003 | 0.022 | 0.025 | 0.008 | — | 0.11 | — | 0.11 | — | — | — | — |
| 4 | 0.080 | 3.3 | 0.080 | 0.018 | 0.003 | 0.021 | 0.024 | 0.009 | — | — | 0.15 | 0.15 | — | — | — | — |
| 5 | 0.082 | 3.3 | 0.080 | 0.020 | 0.006 | 0.026 | 0.025 | 0.008 | — | — | — | — | 0.0025 | — | — | 0.0025 |
| 6 | 0.081 | 3.2 | 0.075 | 0.021 | 0.002 | 0.023 | 0.025 | 0.009 | — | — | — | — | — | 0.0015 | — | 0.0015 |
| 7 | 0.080 | 3.3 | 0.080 | 0.019 | 0.003 | 0.022 | 0.026 | 0.008 | — | — | — | — | — | — | 0.0015 | 0.0015 |
| 8 | 0.079 | 3.3 | 0.080 | 0.022 | 0.001 | 0.023 | 0.025 | 0.009 | — | 0.15 | 0.1 | 0.25 | 0.0026 | — | — | 0.0026 |
| 9 | 0.078 | 3.5 | 0.077 | 0.001 | 0.018 | 0.019 | 0.024 | 0.008 | 0.08 | 0.08 | — | 0.16 | — | 0.0018 | — | 0.0018 |
| 10 | 0.079 | 3.2 | 0.080 | 0.019 | 0.003 | 0.022 | 0.025 | 0.009 | — | — | 0.15 | 0.15 | 0.0021 | — | 0.0015 | 0.0036 |
| 11 | 0.080 | 3.3 | 0.080 | 0.018 | 0.003 | 0.021 | 0.025 | 0.008 | 0.08 | 0.08 | 0.08 | 0.24 | 0.0018 | 0.0018 | 0.0018 | 0.0054 |
| 12 | 0.082 | 3.3 | 0.080 | 0.020 | 0.006 | 0.026 | 0.026 | 0.009 | 0.08 | — | — | 0.08 | — | — | — | — |
| 13 | 0.081 | 3.2 | 0.075 | 0.021 | 0.002 | 0.023 | 0.025 | 0.008 | — | 0.11 | — | 0.11 | — | — | — | — |
| 14 | 0.080 | 3.3 | 0.080 | 0.019 | 0.003 | 0.022 | 0.024 | 0.009 | — | — | 0.15 | 0.15 | — | — | — | — |
| 15 | 0.079 | 3.3 | 0.080 | 0.022 | 0.001 | 0.023 | 0.025 | 0.008 | — | — | — | — | 0.0025 | — | — | 0.0025 |
| 16 | 0.078 | 3.5 | 0.077 | 0.001 | 0.018 | 0.019 | 0.025 | 0.009 | — | — | — | — | — | 0.0015 | — | 0.0015 |
| 17 | 0.079 | 3.2 | 0.080 | 0.019 | 0.003 | 0.022 | 0.026 | 0.008 | — | — | — | — | — | — | 0.0015 | 0.0015 |
| 18 | 0.080 | 3.3 | 0.080 | 0.018 | 0.003 | 0.021 | 0.025 | 0.009 | — | 0.15 | 0.1 | 0.25 | 0.0026 | — | — | 0.0026 |
| 19 | 0.082 | 3.3 | 0.080 | 0.020 | 0.006 | 0.026 | 0.024 | 0.008 | 0.08 | 0.08 | — | 0.16 | — | 0.0018 | — | 0.0018 |
| 20 | 0.081 | 3.2 | 0.075 | 0.021 | 0.002 | 0.023 | 0.025 | 0.009 | — | — | 0.15 | 0.15 | 0.0021 | — | 0.0015 | 0.0036 |
| 21 | 0.080 | 3.3 | 0.080 | 0.019 | 0.003 | 0.022 | 0.025 | 0.008 | 0.08 | 0.08 | 0.08 | 0.24 | 0.0018 | 0.0018 | 0.0018 | 0.0054 |
| 22 | 0.079 | 3.3 | 0.080 | 0.022 | 0.001 | 0.023 | 0.026 | 0.009 | 0.08 | — | — | 0.08 | — | — | — | — |
| 23 | 0.078 | 3.5 | 0.077 | 0.001 | 0.018 | 0.019 | 0.025 | 0.008 | — | 0.11 | — | 0.11 | — | — | — | — |
| 24 | 0.079 | 3.2 | 0.080 | 0.019 | 0.003 | 0.022 | 0.024 | 0.009 | — | — | 0.15 | 0.15 | — | — | — | — |
| 25 | 0.080 | 3.3 | 0.080 | 0.018 | 0.003 | 0.021 | 0.025 | 0.008 | — | — | — | — | 0.0025 | — | — | 0.0025 |
| 26 | 0.082 | 3.3 | 0.080 | 0.020 | 0.006 | 0.026 | 0.025 | 0.009 | — | — | — | — | — | 0.0015 | — | 0.0015 |
| 27 | 0.081 | 3.2 | 0.075 | 0.021 | 0.002 | 0.023 | 0.026 | 0.008 | — | — | — | — | — | — | 0.0015 | 0.0015 |
| 28 | 0.080 | 3.3 | 0.080 | 0.019 | 0.003 | 0.022 | 0.025 | 0.009 | — | 0.15 | 0.1 | 0.25 | 0.0026 | — | — | 0.0026 |
| 29 | 0.079 | 3.3 | 0.080 | 0.022 | 0.001 | 0.023 | 0.024 | 0.008 | 0.08 | 0.08 | — | 0.16 | — | 0.0018 | — | 0.0018 |
| 30 | 0.078 | 3.5 | 0.077 | 0.001 | 0.018 | 0.019 | 0.025 | 0.009 | — | — | 0.15 | 0.15 | 0.0021 | — | 0.0015 | 0.0036 |
| 31 | 0.079 | 3.2 | 0.080 | 0.019 | 0.003 | 0.022 | 0.025 | 0.008 | 0.08 | 0.08 | 0.08 | 0.24 | 0.0018 | 0.0018 | 0.0018 | 0.0054 |
| 32 | 0.080 | 3.3 | 0.080 | 0.018 | 0.003 | 0.021 | 0.026 | 0.009 | 0.08 | — | — | 0.08 | — | — | — | — |
| 33 | 0.082 | 3.3 | 0.080 | 0.020 | 0.006 | 0.026 | 0.025 | 0.008 | — | 0.11 | — | 0.11 | — | — | — | — |
| 34 | 0.081 | 3.2 | 0.075 | 0.021 | 0.002 | 0.023 | 0.024 | 0.009 | — | — | 0.15 | 0.15 | — | — | — | — |
| 35 | 0.080 | 3.3 | 0.080 | 0.019 | 0.003 | 0.022 | 0.025 | 0.008 | — | — | — | — | 0.0025 | — | — | 0.0025 |
| 36 | 0.080 | 3.3 | 0.080 | 0.022 | 0.001 | 0.023 | 0.025 | 0.009 | — | — | — | — | — | 0.0015 | — | 0.0015 |
| 37 | 0.082 | 3.5 | 0.077 | 0.001 | 0.018 | 0.019 | 0.026 | 0.008 | — | — | — | — | — | — | 0.0015 | 0.0015 |
| 38 | 0.081 | 3.2 | 0.080 | 0.019 | 0.003 | 0.022 | 0.025 | 0.008 | — | 0.15 | 0.1 | 0.25 | 0.0026 | — | — | 0.0026 |
| 39 | 0.080 | 3.3 | 0.080 | 0.018 | 0.003 | 0.021 | 0.024 | 0.009 | 0.08 | 0.08 | — | 0.16 | — | 0.0018 | — | 0.0018 |
| 40 | 0.080 | 3.3 | 0.080 | 0.020 | 0.006 | 0.026 | 0.025 | 0.008 | — | — | 0.15 | 0.15 | 0.0021 | — | 0.0015 | 0.0036 |
| 41 | 0.082 | 3.2 | 0.075 | 0.021 | 0.002 | 0.023 | 0.025 | 0.008 | 0.08 | 0.08 | 0.08 | 0.24 | 0.0018 | 0.0018 | 0.0018 | 0.0054 |
| 42 | 0.081 | 3.3 | 0.080 | 0.019 | 0.003 | 0.022 | 0.026 | 0.009 | — | 0.15 | 0.1 | 0.25 | 0.0026 | — | — | 0.0026 |
| 43 | 0.080 | 3.2 | 0.080 | 0.020 | 0.006 | 0.026 | 0.025 | 0.008 | 0.08 | 0.08 | — | 0.16 | — | 0.0018 | — | 0.0018 |
| 44 | 0.085 | 3.3 | 0.075 | 0.021 | 0.002 | 0.023 | 0.024 | 0.009 | — | — | 0.15 | 0.15 | 0.0021 | — | 0.0015 | 0.0036 |
| 45 | 0.081 | 3.2 | 0.080 | 0.019 | 0.003 | 0.022 | 0.025 | 0.008 | 0.08 | 0.08 | 0.08 | 0.24 | 0.0018 | 0.0018 | 0.0018 | 0.0054 |
| 46 | 0.082 | 3.3 | 0.080 | 0.020 | 0.006 | 0.026 | 0.025 | 0.008 | — | — | — | — | 0.0025 | — | — | 0.0025 |
| 47 | 0.079 | 3.3 | 0.080 | 0.022 | 0.001 | 0.023 | 0.025 | 0.008 | — | — | — | — | 0.0025 | — | — | 0.0025 |
| 48 | 0.080 | 3.3 | 0.080 | 0.019 | 0.003 | 0.022 | 0.025 | 0.008 | 0.08 | 0.08 | 0.08 | 0.24 | 0.0018 | 0.0018 | 0.0018 | 0.0054 | pickled hot rolled steel sheet was cold rolled to produce cold rolled steel sheet having a thickness of 0.22 mm. In each cold rolled steel sheet, the cold rolling rate was 90.4%.

The cold rolled steel sheet was annealed by primary recrystallization annealing doubling as decarburization annealing. The annealing temperature of the primary recrystallization annealing was, in each of the cold rolled steel sheets, 850° C. The holding time at the annealing temperature was 2 minutes.

The cold rolled steel sheet after the primary recrystallization annealing was coated with an aqueous slurry. The aqueous slurry was prepared by mixing the annealing separator and water by a mixing ratio of 1:7 based on mass. Table 2 shows the conditions of the annealing separator all together. The underlines in Table 2 show values outside the scope of one aspect of the present invention. Note that, the content (%) described in Table 2 is the mass % with respect to the content of MgO contained in the annealing separator.

In Table 2, for the MgO of the main constituent of the annealing separator, five types of the following (A) to (E) with different particle size distributions were used. The respective particle size distributions were (A) A content of particles with a particle size of 1.0 μm or less of 25 mass % with respect to the content of MgO as a whole, a content of particles with a particle size of 10 μm or more of 4 mass %, a $D_{20}$ particle size of 0.9 m, a $D_{30}$ particle size of 1.1 μm, and a $D_{50}$ particle size (median size) of 2.25 m, (B) A content of particles with a particle size of 1.0 μm or less of 10 mass % with respect to the content of MgO as a whole, a content of particles with a particle size of 10 μm or more of 4 mass %, a $D_{20}$ particle size of 1.5 m, a $D_{30}$ particle size of 1.8 μm, and a $D_{50}$ particle size (median size) of 4.56 m, (C) A content of particles with a particle size of 1.0 μm or less of 35 mass % with respect to the content of MgO as a whole, a content of particles with a particle size of 10 μm or more of 4 mass %, a $D_{20}$ particle size of 0.5 m, a $D_{30}$ particle size of 0.7 μm, and a $D_{50}$ particle size (median size) of 1.81 μm, (D) A content of particles with a particle size of 1.0 μm or less of 25 mass % with respect to the content of MgO as a whole, a content of particles with a particle size of 10 μm or more of 1 mass %, a $D_{20}$ particle size of 0.9 μm, a $D_{30}$ particle size of 1.1 μm, and a $D_{50}$ particle size (median size) of 2.08 m, and (E) A content of particles with a particle size of 1.0 μm or less of 25 mass % with respect to the content of MgO as a whole, a content of particles with a particle size of 10 μm or more of 8 mass %, a $D_{20}$ particle size of 0.9 m, a $D_{30}$ particle size of 1.1 μm, and a $D_{50}$ particle size (median size) of 4.00 μm.

TABLE 2

Annealing separator

| Test no. | MgO particle size distribution | Ca compound (%) | Sr compound (%) | Ba compound (%) | Total content of Ca, Sr, Ba compounds (%) | X/ ([Ca] + [Sr] + [Ba]) | Mean particle size of Ca compound (μm) | Ratio of mean particle size of Ca compound to median size of MgO | Mean particle size of Sr compound (μm) | Ratio of mean particle size of Sr compound to median size of MgO | Mean particle size of Ba compound (μm) |
|---|---|---|---|---|---|---|---|---|---|---|---|
| 1 | A | 8.0 | 0.1 | 0.1 | 8.2 | 0.98 | 2.5 | 1.1 | 4.5 | 2.0 | 4.2 |
| 2 | A | 8.0 | 0.1 | 0.1 | 8.2 | 0.98 | 2.5 | 1.1 | 4.5 | 2.0 | 4.2 |
| 3 | A | 8.0 | 0.1 | 0.1 | 8.2 | 0.98 | 2.5 | 1.1 | 4.5 | 2.0 | 4.2 |
| 4 | A | 8.0 | 0.1 | 0.1 | 8.2 | 0.98 | 2.5 | 1.1 | 4.5 | 2.0 | 4.2 |
| 5 | A | 8.0 | 0.1 | 0.1 | 8.2 | 0.98 | 2.5 | 1.1 | 4.5 | 2.0 | 4.2 |
| 6 | A | 8.0 | 0.1 | 0.1 | 8.2 | 0.98 | 2.5 | 1.1 | 4.5 | 2.0 | 4.2 |
| 7 | A | 8.0 | 0.1 | 0.1 | 8.2 | 0.98 | 2.5 | 1.1 | 4.5 | 2.0 | 4.2 |
| 8 | A | 8.0 | 0.1 | 0.1 | 8.2 | 0.98 | 2.5 | 1.1 | 4.5 | 2.0 | 4.2 |
| 9 | A | 8.0 | 0.1 | 0.1 | 8.2 | 0.98 | 2.5 | 1.1 | 4.5 | 2.0 | 4.2 |
| 10 | A | 8.0 | 0.1 | 0.1 | 8.2 | 0.98 | 2.5 | 1.1 | 4.5 | 2.0 | 4.2 |
| 11 | A | 8.0 | 0.1 | 0.1 | 8.2 | 0.98 | 2.5 | 1.1 | 4.5 | 2.0 | 4.2 |
| 12 | A | 4.0 | — | — | 4.0 | 1.00 | 5.1 | 2.3 | — | — | — |
| 13 | A | 4.0 | — | — | 4.0 | 1.00 | 5.1 | 2.3 | — | — | — |
| 14 | A | — | 4.5 | — | 4.5 | 1.00 | — | — | 5.0 | 2.3 | — |
| 15 | A | — | 4.5 | — | 4.5 | 1.00 | — | — | 5.0 | 2.3 | — |
| 16 | A | — | — | 5.0 | 5.0 | 1.00 | — | — | — | — | 4.5 |
| 17 | A | — | — | 5.0 | 5.0 | 1.00 | — | — | — | — | 4.5 |
| 18 | A | 3.5 | — | 0.1 | 3.6 | 0.99 | 3.9 | 1.8 | — | — | 3.7 |
| 19 | A | — | 3.5 | 0.2 | 3.7 | 0.96 | — | — | 3.9 | 1.8 | 3.7 |
| 20 | A | 0.2 | 3.5 | — | 3.7 | 0.93 | 3.8 | 1.7 | 3.9 | 1.8 | — |
| 21 | A | 0.3 | 0.1 | 3.5 | 3.9 | 0.85 | 2.5 | 1.1 | 4.1 | 1.9 | 2.5 |

Annealing separator

| Test no. | Ratio of mean particle size of Ba compound to median size of MgO | Mean particle size of Ca, Sr, Ba compound as whole (μm) | Mean particle size of compound of element with highest content in Ca, Sr, Ba compounds (μm) | $TiO_2$ (%) | $Y_2O_3$ (%) | $La_2O_3$ (%) | $CeO_2$ (%) | $Ce(OH)_4$ (%) | Total content of Ti, Y, La, Ce compounds (%) | Type of Ca, Sr, Ba compounds |
|---|---|---|---|---|---|---|---|---|---|---|
| 1 | 1.9 | 2.5 | 2.5 | 4.0 | — | 0.1 | 4.0 | — | 8.1 | $CaSO_4$, $SrSO_4$, $BaSO_4$ |
| 2 | 1.9 | 2.5 | 2.5 | 4.0 | — | 0.1 | 4.0 | — | 8.1 | $CaSO_4$, $SrSO_4$, $BaSO_4$ |

TABLE 2-continued

| | | | | | | | | | | |
|---|---|---|---|---|---|---|---|---|---|---|
| | 3 | 1.9 | 2.5 | 2.5 | 4.0 | — | 0.1 | 4.0 | — | 8.1 | $CaSO_4$, $SrSO_4$, $BaSO_4$ |
| | 4 | 1.9 | 2.5 | 2.5 | 4.0 | — | 0.1 | 4.0 | — | 8.1 | $CaSO_4$, $SrSO_4$, $BaSO_4$ |
| | 5 | 1.9 | 2.5 | 2.5 | 4.0 | 0.3 | 0.1 | 4.0 | — | 8.4 | $CaSO_4$, $SrSO_4$, $BaSO_4$ |
| | 6 | 1.9 | 2.5 | 2.5 | 4.0 | — | 0.1 | 4.0 | — | 8.1 | $CaSO_4$, $SrSO_4$, $BaSO_4$ |
| | 7 | 1.9 | 2.5 | 2.5 | 4.0 | — | 0.1 | 4.0 | — | 8.1 | $CaSO_4$, $SrSO_4$, $BaSO_4$ |
| | 8 | 1.9 | 2.5 | 2.5 | 4.0 | — | 0.1 | 4.0 | — | 8.1 | $CaSO_4$, $SrSO_4$, $BaSO_4$ |
| | 9 | 1.9 | 2.5 | 2.5 | 4.0 | 0.5 | 0.1 | 4.0 | | 8.6 | $CaSO_4$, $SrSO_4$, $BaSO_4$ |
| | 10 | 1.9 | 2.5 | 2.5 | 4.0 | — | 0.1 | 4.0 | — | 8.1 | $CaSO_4$, $SrSO_4$, $BaSO_4$ |
| | 11 | 1.9 | 2.5 | 2.5 | 4.0 | 1.0 | 0.1 | 4.0 | — | 9.1 | $CaSO_4$, $SrSO_4$, $BaSO_4$ |
| | 12 | — | 5.1 | 5.1 | 8.0 | — | — | — | 3.0 | 11.0 | $CaCO_3$ |
| | 13 | — | 5.1 | 5.1 | 8.0 | — | — | — | 3.0 | 11.0 | $CaCO_4$ |
| | 14 | — | 5.0 | 5.0 | — | 2.0 | 2.0 | 3.0 | — | 7.0 | $SrCO_4$ |
| | 15 | — | 5.0 | 5.0 | — | — | 2.0 | 3.0 | — | 5.0 | $SrCO_3$ |
| | 16 | 2.0 | 4.5 | 4.5 | — | — | 2.0 | — | 3.5 | 5.5 | $BaSO4$ |
| | 17 | 2.0 | 4.5 | 4.5 | — | — | 2.0 | — | 3.5 | 5.5 | $BaSO4$ |
| | 18 | 1.7 | 3.9 | 3.9 | — | — | 4.5 | — | — | 4.5 | $Ca(OH)_2$, $BaSO_4$ |
| | 19 | 1.7 | 3.9 | 3.9 | 4.0 | — | 0.2 | — | — | 4.2 | $SrSO_4$, $BaSO_4$ |
| | 20 | — | 3.9 | 3.9 | 4.0 | — | — | 4.0 | — | 8.0 | $CaSO_4$, $SrSO_4$ |
| | 21 | 1.1 | 2.5 | 2.5 | 6.0 | — | 0.1 | 2.5 | — | 8.6 | $CaSO_4$, $SrSO_4$, $BaSO_4$ |

| | | | | | Annealing separator | | | | | |
|---|---|---|---|---|---|---|---|---|---|---|
| Test no. | MgO particle size distribution | Ca compound (%) | Sr compound (%) | Ba compound (%) | Total content of Ca, Sr, Ba compounds (%) | X/([Ca] + [Sr] + [Ba]) | Mean particle size of Ca compound (μm) | Ratio of mean particle size of Ca compound to median size of MgO | Mean particle size of Sr compound (μm) | Ratio of mean particle size of Sr compound to median size of MgO | Mean particle size of Ba compound (μm) |
| 22 | A | <u>11.1</u> | — | — | <u>11.1</u> | 1.00 | 2.5 | 1.1 | — | — | — |
| 23 | A | — | <u>10.5</u> | — | <u>10.5</u> | 1.00 | — | — | 2.5 | 1.1 | — |
| 24 | A | — | — | <u>10.5</u> | <u>10.5</u> | 1.00 | — | — | — | — | 2.5 |
| 25 | A | <u>0.4</u> | — | — | <u>0.4</u> | 1.00 | 2.5 | 1.1 | — | — | — |
| 26 | A | — | <u>0.4</u> | — | <u>0.4</u> | 1.00 | — | — | 2.5 | 1.1 | — |
| 27 | A | — | — | <u>0.4</u> | <u>0.4</u> | 1.00 | — | — | — | — | 2.5 |
| 28 | A | 5.0 | 0.1 | <u>0.1</u> | <u>5.2</u> | 0.97 | 3.7 | 1.7 | 4.1 | 1.9 | 2.5 |
| 29 | A | 4.5 | — | 2.0 | 6.5 | <u>0.79</u> | 3.7 | 1.7 | — | — | 2.5 |
| 30 | A | — | 6.0 | — | 6.0 | 1.00 | — | — | <u>12.3</u> | <u>5.6</u> | — |
| 31 | A | 0.1 | 5.5 | 0.1 | 5.7 | 0.96 | 3.7 | 1.7 | <u>4.1</u> | <u>1.9</u> | 2.5 |
| 32 | A | 3.5 | — | — | 3.5 | 1.00 | <u>11.5</u> | <u>5.2</u> | — | — | — |
| 33 | A | — | 5.0 | — | 5.0 | 1.00 | — | — | <u>0.8</u> | <u>0.4</u> | — |
| 34 | <u>B</u> | — | — | 3.0 | 3.0 | 1.00 | — | — | — | — | 4.1 |
| 35 | <u>B</u> | 3.0 | — | — | 3.0 | 1.00 | <u>12.3</u> | <u>2.7</u> | — | — | — |
| 36 | <u>B</u> | — | 3.0 | — | 3.0 | 1.00 | — | — | <u>0.8</u> | <u>0.2</u> | — |
| 37 | <u>C</u> | — | — | 3.0 | 3.0 | 1.00 | — | — | — | — | 4.1 |
| 38 | <u>C</u> | 3.0 | — | — | 3.0 | 1.00 | <u>12.3</u> | <u>6.8</u> | — | — | — |
| 39 | <u>C</u> | — | 3.0 | — | 3.0 | 1.00 | — | — | <u>0.8</u> | <u>0.4</u> | — |
| 40 | <u>D</u> | — | — | 3.0 | 3.0 | 1.00 | — | — | — | — | 4.1 |
| 41 | <u>D</u> | 3.0 | — | — | 3.0 | 1.00 | <u>12.3</u> | <u>5.9</u> | — | — | — |
| 42 | <u>D</u> | — | 3.0 | — | 3.0 | 1.00 | — | — | <u>0.8</u> | <u>0.4</u> | — |
| 43 | <u>E</u> | — | — | 3.0 | 3.0 | 1.00 | — | — | — | — | 4.1 |
| 44 | <u>E</u> | 3.0 | — | — | 3.0 | 1.00 | <u>12.3</u> | <u>3.1</u> | — | — | — |
| 45 | <u>E</u> | — | 3.0 | — | 3.0 | 1.00 | — | — | <u>0.8</u> | <u>0.2</u> | — |
| 46 | A | 8.0 | 0.1 | 0.1 | 8.2 | 0.98 | <u>11.5</u> | <u>5.2</u> | <u>4.5</u> | <u>2.0</u> | 4.2 |
| 47 | A | — | 4.5 | — | 4.5 | 1.00 | — | — | <u>12.3</u> | <u>5.6</u> | — |
| 48 | A | 0.3 | 0.1 | 3.5 | 3.9 | <u>0.85</u> | 2.5 | 1.1 | <u>4.1</u> | <u>1.9</u> | <u>11.5</u> |

| | | | Annealing separator | | | | | | |
|---|---|---|---|---|---|---|---|---|---|
| Test no. | Ratio of mean particle size of Ba compound to median size of MgO | Mean particle size of Ca, Sr, Ba compound as whole (μm) | Mean particle size of compound of element with highest content in Ca, Sr, Ba compounds (μm) | $TiO_2$ (%) | $Y_2O_3$ (%) | $La_2O_3$ (%) | $CeO_2$ (%) | $Ce(OH)_4$ (%) | Total content of Ti, Y, La, Ce compounds (%) | Type of Ca, Sr, Ba compounds |
| 22 | — | 2.5 | 2.5 | 3.0 | — | — | — | — | 3.0 | $CaSO_4$ |
| 23 | — | 2.5 | 2.5 | — | — | — | 4.0 | — | 4.0 | $SrSO_4$ |

TABLE 2-continued

| | | | | | | | | | | |
|---|---|---|---|---|---|---|---|---|---|---|
| 24 | 1.1 | 2.5 | 2.5 | — | — | — | — | 4.0 | 4.0 | BaSO$_4$ |
| 25 | — | 2.5 | 2.5 | 3.0 | — | — | — | — | 3.0 | CaSO$_4$ |
| 26 | — | 2.5 | 2.5 | — | — | — | 4.0 | — | 4.0 | SrSO$_4$ |
| 27 | 1.1 | 2.5 | 2.5 | — | — | — | — | 4.0 | 4.0 | BaSO$_4$ |
| 28 | 1.1 | 3.7 | 3.7 | <u>0.1</u> | — | <u>0.1</u> | <u>0.1</u> | <u>0.1</u> | <u>0.4</u> | CaSO$_4$, SrSO$_4$, BaSO$_4$ |
| 29 | 1.1 | 3.4 | 3.7 | 3.0 | — | — | 2.5 | — | 5.5 | CaSO$_4$, BaSO$_4$ |
| 30 | — | 12.3 | 12.3 | 3.0 | — | — | 2.5 | — | 5.5 | SrSO$_4$ |
| 31 | 1.1 | <u>4.1</u> | <u>4.1</u> | 8.0 | — | 0.2 | — | 7.5 | <u>15.7</u> | CaSO$_4$, SrSO$_4$, BaSO$_4$ |
| 32 | — | <u>11.5</u> | <u>11.5</u> | 8.0 | 0.3 | — | — | 7.5 | <u>15.8</u> | CaCO$_3$ |
| 33 | — | <u>0.8</u> | <u>0.8</u> | 3.0 | — | — | 2.5 | — | <u>5.5</u> | SrSO$_4$ |
| 34 | 0.9 | <u>4.1</u> | <u>4.1</u> | 3.0 | — | 0.1 | — | — | 3.1 | BaSO$_4$ |
| 35 | — | <u>12.3</u> | <u>12.3</u> | 3.0 | — | 0.1 | — | — | 3.1 | CaCO$_3$ |
| 36 | — | <u>0.8</u> | <u>0.8</u> | 3.0 | — | 0.1 | — | — | 3.1 | SrSO$_4$ |
| 37 | 2.3 | <u>4.1</u> | <u>4.1</u> | — | — | — | 3.5 | — | 3.5 | BaSO$_4$ |
| 38 | — | <u>12.3</u> | <u>12.3</u> | — | 2.0 | — | 3.5 | — | 5.5 | CaCO$_3$ |
| 39 | — | <u>0.8</u> | <u>0.8</u> | — | — | — | 3.5 | — | 3.5 | SrSO$_4$ |
| 40 | 2.0 | <u>4.1</u> | <u>4.1</u> | 4.5 | — | — | — | — | 4.5 | BaSO$_4$ |
| 41 | — | <u>12.3</u> | <u>12.3</u> | 4.5 | — | — | — | — | 4.5 | CaCO$_4$ |
| 42 | — | <u>0.8</u> | <u>0.8</u> | 4.5 | — | — | — | — | 4.5 | SrSO$_4$ |
| 43 | 1.0 | <u>4.1</u> | <u>4.1</u> | — | 2.0 | — | — | 3.5 | 5.5 | BaSO$_4$ |
| 44 | — | <u>12.3</u> | <u>12.3</u> | — | — | — | — | 3.5 | 3.5 | CaCO$_4$ |
| 45 | — | <u>0.8</u> | <u>0.8</u> | — | — | — | — | 3.5 | 3.5 | SrSO$_4$ |
| 46 | 1.9 | <u>11.4</u> | <u>11.5</u> | 4.0 | 0.3 | 0.1 | 4.0 | — | 8.4 | CaSO$_4$, SrSO$_4$, BaSO$_4$ |
| 47 | — | <u>12.3</u> | <u>12.3</u> | — | — | 2.0 | 3.0 | — | 5.0 | SrCO$_3$ |
| 48 | <u>5.2</u> | <u>10.3</u> | <u>11.5</u> | 6.0 | — | 0.1 | 2.5 | — | 8.6 | CaSO$_4$, SrSO$_4$, BaSO$_4$ |

The cold rolled steel sheet with an aqueous slurry coated on its surface was, in each of the numbered tests, baked at 900° C. for 10 seconds to dry the aqueous slurry. Here, the amount of the annealing separator coated on the dried steel sheet was 5 g/m$^2$ per side.

After baking, the finish annealing treatment was performed. In the finish annealing treatment, in each of the numbered tests, the sheet was held at 1200° C. for 20 hours. Due to the above manufacturing process, grain-oriented electrical steel sheet having a base steel sheet and a primary coating was manufactured.

Analysis of Chemical Composition of Base Steel Sheet of Grain-Oriented Electrical Steel Sheet The primary coatings of the grain-oriented electrical steel sheets of Test Nos. 1 to 48 manufactured were removed by sulfuric acid and nitric acid to obtain the base steel sheets. The base steel sheets were examined by spark discharge optical emission spectrometry and atomic adsorption spectrometry to find the chemical compositions of the base steel sheets. The found chemical compositions are shown in Table 3. Here, in each of Test Nos. 1 to 48, the total content of Sn, Sb, Cu, Bi, Te, and Pb was 0.03% or less. Note that, the underlines in Table 3 show values outside the scope of one aspect of the present invention.

TABLE 3

| | | | | | | | | | | Grain-oriented electrical steel sheet | | | | |
|---|---|---|---|---|---|---|---|---|---|---|---|---|---|---|
| Test no. | C (%) | Si (%) | Mn (%) | S (%) | Se (%) | S + Se (%) | sol. Al (%) | N (%) | Al peak position $D_{Al}$ (µm) | Sum of perimeters of Al oxides (µm/µm$^2$) | Number density of Al oxides (/µm$^2$) | Magnetic properties | Adhesion | Class |
| 1 | 0.0008 | 3.2 | 0.077 | 0.0005 | 0.0002 | 0.0007 | 0.001 | 0.002 | 4.5 | 0.98 | 0.18 | Good | Good | Inv. ex. |
| 2 | 0.0005 | 3.4 | 0.076 | 0.0002 | 0.0005 | 0.0007 | 0.001 | 0.003 | 4.7 | 0.52 | 0.09 | Excellent | Good | Inv. ex. |
| 3 | 0.0009 | 3.1 | 0.078 | 0.0005 | 0.0004 | 0.0009 | 0.001 | 0.001 | 4.9 | 0.52 | 0.08 | Excellent | Good | Inv. ex. |
| 4 | 0.0005 | 3.2 | 0.077 | 0.0005 | 0.0005 | 0.0010 | 0.001 | 0.001 | 4.2 | 0.56 | 0.07 | Excellent | Good | Inv. ex. |
| 5 | 0.0009 | 3.2 | 0.076 | 0.0005 | 0.0004 | 0.0009 | 0.001 | 0.001 | 4.5 | 0.48 | 0.07 | Excellent | Good | Inv. ex. |
| 6 | 0.0005 | 3.1 | 0.074 | 0.0006 | 0.0005 | 0.0011 | 0.001 | 0.001 | 4.1 | 0.56 | 0.06 | Excellent | Good | Inv. ex. |
| 7 | 0.0005 | 3.2 | 0.077 | 0.0005 | 0.0004 | 0.0009 | 0.001 | 0.001 | 4.6 | 0.51 | 0.08 | Excellent | Good | Inv. ex. |
| 8 | 0.0009 | 3.2 | 0.077 | 0.0006 | 0.0001 | 0.0007 | 0.001 | 0.001 | 5.1 | 0.41 | 0.06 | Excellent | Good | Inv. ex. |
| 9 | 0.0005 | 3.4 | 0.076 | 0.0002 | 0.0005 | 0.0007 | 0.001 | 0.002 | 4.8 | 0.55 | 0.07 | Excellent | Good | Inv. ex. |
| 10 | 0.0005 | 3.1 | 0.078 | 0.0005 | 0.0004 | 0.0009 | 0.001 | 0.002 | 4.9 | 0.51 | 0.08 | Excellent | Good | Inv. ex. |
| 11 | 0.0009 | 3.2 | 0.077 | 0.0006 | 0.0005 | 0.0011 | 0.001 | 0.001 | 4.7 | 0.66 | 0.08 | Excellent | Good | Inv. ex. |
| 12 | 0.0005 | 3.2 | 0.076 | 0.0005 | 0.0004 | 0.0009 | 0.001 | 0.001 | 9.7 | 0.75 | 0.18 | Excellent | Good | Inv. ex. |
| 13 | 0.0005 | 3.1 | 0.075 | 0.0006 | 0.0005 | 0.0011 | 0.001 | 0.002 | 9.5 | 0.95 | 0.12 | Excellent | Good | Inv. ex. |
| 14 | 0.0009 | 3.2 | 0.077 | 0.0005 | 0.0004 | 0.0009 | 0.001 | 0.001 | 5.2 | 0.35 | 0.06 | Excellent | Good | Inv. ex. |
| 15 | 0.0005 | 3.2 | 0.077 | 0.0005 | 0.0001 | 0.0006 | 0.001 | 0.002 | 4.9 | 0.34 | 0.08 | Excellent | Good | Inv. ex. |
| 16 | 0.0005 | 3.4 | 0.076 | 0.0002 | 0.0005 | 0.0007 | 0.001 | 0.002 | 6.1 | 0.31 | 0.09 | Excellent | Good | Inv. ex. |
| 17 | 0.0009 | 3.1 | 0.078 | 0.0005 | 0.0004 | 0.0009 | 0.001 | 0.003 | 6.2 | 0.51 | 0.12 | Excellent | Good | Inv. ex. |
| 18 | 0.0005 | 3.2 | 0.077 | 0.0006 | 0.0005 | 0.0011 | 0.001 | 0.001 | 5.1 | 0.61 | 0.09 | Excellent | Good | Inv. ex. |
| 19 | 0.0005 | 3.2 | 0.076 | 0.0005 | 0.0004 | 0.0009 | 0.001 | 0.001 | 5.8 | 0.62 | 0.08 | Excellent | Good | Inv. ex. |
| 20 | 0.0009 | 3.1 | 0.075 | 0.0006 | 0.0005 | 0.0011 | 0.001 | 0.001 | 4.9 | 0.63 | 0.04 | Excellent | Good | Inv. ex. |
| 21 | 0.0005 | 3.2 | 0.077 | 0.0004 | 0.0004 | 0.0008 | 0.001 | 0.001 | 5.5 | 0.25 | 0.03 | Excellent | Good | Inv. ex. |

TABLE 3-continued

Grain-oriented electrical steel sheet

| Test no. | C (%) | Si (%) | Mn (%) | S (%) | Se (%) | S + Se (%) | sol. Al (%) | N (%) | Al peak position $D_{Al}$ (μm) | Sum of perimeters of Al oxides (μm/μm²) | Number density of Al oxides (/μm²) | Magnetic properties | Adhesion | Class |
|---|---|---|---|---|---|---|---|---|---|---|---|---|---|---|
| 22 | 0.0005 | 3.2 | 0.077 | 0.0004 | 0.0001 | 0.0005 | 0.001 | 0.001 | 1.9 | 0.18 | 0.03 | Fair | Poor | Comp. ex. |
| 23 | 0.0009 | 3.4 | 0.076 | 0.0004 | 0.0005 | 0.0009 | 0.001 | 0.001 | 1.8 | 0.18 | 0.03 | Fair | Poor | Comp. ex. |
| 24 | 0.0005 | 3.1 | 0.078 | 0.0004 | 0.0004 | 0.0008 | 0.001 | 0.002 | 1.7 | 0.19 | 0.03 | Fair | Poor | Comp. ex. |
| 25 | 0.0009 | 3.2 | 0.077 | 0.0004 | 0.0005 | 0.0009 | 0.001 | 0.002 | 2.1 | 0.15 | 0.01 | Poor | Poor | Comp. ex. |
| 26 | 0.0005 | 3.2 | 0.076 | 0.0004 | 0.0004 | 0.0008 | 0.001 | 0.001 | 2.1 | 0.16 | 0.01 | Poor | Poor | Comp. ex. |
| 27 | 0.0005 | 3.1 | 0.075 | 0.0004 | 0.0005 | 0.0009 | 0.001 | 0.001 | 2.2 | 0.15 | 0.01 | Poor | Poor | Comp. ex. |
| 28 | 0.0009 | 3.2 | 0.077 | 0.0004 | 0.0004 | 0.0008 | 0.001 | 0.002 | 1.5 | 0.11 | 0.01 | Fair | Poor | Comp. ex. |
| 29 | 0.0005 | 3.2 | 0.077 | 0.0004 | 0.0001 | 0.0005 | 0.001 | 0.001 | 1.8 | 0.11 | 0.01 | Poor | Poor | Comp. ex. |
| 30 | 0.0005 | 3.4 | 0.077 | 0.0002 | 0.0005 | 0.0007 | 0.001 | 0.002 | 2.1 | 0.15 | 0.02 | Good | Fair | Comp. ex. |
| 31 | 0.0009 | 3.1 | 0.078 | 0.0004 | 0.0004 | 0.0008 | 0.001 | 0.002 | 12.5 | 1.56 | 0.25 | Poor | Good | Comp. ex. |
| 32 | 0.0005 | 3.2 | 0.077 | 0.0004 | 0.0005 | 0.0009 | 0.001 | 0.003 | 12.8 | 1.53 | 0.23 | Poor | Good | Comp. ex. |
| 33 | 0.0005 | 3.2 | 0.076 | 0.0004 | 0.0004 | 0.0008 | 0.001 | 0.001 | 2.2 | 0.15 | 0.01 | Poor | Poor | Comp. ex. |
| 34 | 0.0005 | 3.1 | 0.074 | 0.0004 | 0.0005 | 0.0009 | 0.001 | 0.001 | 1.6 | 0.11 | 0.01 | Good | Poor | Comp. ex. |
| 35 | 0.0005 | 3.2 | 0.077 | 0.0004 | 0.0004 | 0.0008 | 0.001 | 0.001 | 1.5 | 0.12 | 0.01 | Fair | Poor | Comp. ex. |
| 36 | 0.0005 | 3.2 | 0.077 | 0.0004 | 0.0001 | 0.0005 | 0.001 | 0.001 | 1.6 | 0.12 | 0.01 | Poor | Poor | Comp. ex. |
| 37 | 0.0005 | 3.4 | 0.076 | 0.0002 | 0.0005 | 0.0007 | 0.001 | 0.001 | 1.8 | 0.11 | 0.01 | Fair | Poor | Comp. ex. |
| 38 | 0.0005 | 3.1 | 0.078 | 0.0004 | 0.0004 | 0.0008 | 0.001 | 0.001 | 1.6 | 0.12 | 0.01 | Fair | Poor | Comp. ex. |
| 39 | 0.0005 | 3.2 | 0.077 | 0.0004 | 0.0005 | 0.0009 | 0.001 | 0.002 | 1.5 | 0.12 | 0.01 | Poor | Poor | Comp. ex. |
| 40 | 0.0005 | 3.2 | 0.076 | 0.0004 | 0.0004 | 0.0008 | 0.001 | 0.002 | 1.5 | 0.12 | 0.01 | Fair | Poor | Comp. ex. |
| 41 | 0.0005 | 3.1 | 0.075 | 0.0004 | 0.0005 | 0.0009 | 0.001 | 0.001 | 1.6 | 0.12 | 0.01 | Good | Poor | Comp. ex. |
| 42 | 0.0005 | 3.2 | 0.077 | 0.0004 | 0.0004 | 0.0008 | 0.001 | 0.001 | 1.8 | 0.11 | 0.01 | Poor | Poor | Comp. ex. |
| 43 | 0.0005 | 3.1 | 0.077 | 0.0004 | 0.0004 | 0.0008 | 0.001 | 0.002 | 1.6 | 0.12 | 0.01 | Good | Poor | Comp. ex. |
| 44 | 0.0005 | 3.2 | 0.075 | 0.0004 | 0.0005 | 0.0009 | 0.001 | 0.001 | 1.6 | 0.12 | 0.01 | Fair | Poor | Comp. ex. |
| 45 | 0.0005 | 3.1 | 0.077 | 0.0004 | 0.0004 | 0.0008 | 0.001 | 0.002 | 1.5 | 0.12 | 0.01 | Poor | Poor | Comp. ex. |
| 46 | 0.0009 | 3.2 | 0.076 | 0.0005 | 0.0004 | 0.0009 | 0.001 | 0.001 | 1.8 | 0.13 | 0.01 | Excellent | Poor | Comp. ex. |
| 47 | 0.0005 | 3.2 | 0.077 | 0.0005 | 0.0001 | 0.0006 | 0.001 | 0.002 | 1.6 | 0.12 | 0.01 | Excellent | Poor | Comp. ex. |
| 48 | 0.0005 | 3.2 | 0.077 | 0.0004 | 0.0004 | 0.0008 | 0.001 | 0.001 | 1.7 | 0.12 | 0.01 | Excellent | Poor | Comp. ex. |

Evaluation Tests

Al Peak Position $D_{Al}$ Measurement Test

For each of the grain-oriented electrical steel sheet of the numbered tests, the following measurement method was used to find the Al peak position $D_{Al}$. Specifically, under the later explained conditions, the surface of the grain-oriented electrical steel sheet was examined by elemental analysis using the GDS method. At any selected 36 m×50 μm observed region, the elemental analysis was conducted in a range of 100 μm in the depth direction from the surface of the grain-oriented electrical steel sheet (in the surface layer). The Al contained at different depth positions in the surface layer was identified. The emission intensity of the identified Al was plotted in the depth direction from the surface.

GDS Elemental Analysis Conditions
　Apparatus: High frequency glow discharge optical emission spectrometric analysis apparatus (made by RIGAKU, Model No. "GDA750")
　Ar gas pressure: 3 hPa
　Anode diameter: 6 mmcp
　Electric power: 20 W
　Measurement time: 30 to 100 seconds
　Based on a graph of the Al emission intensity plotted, the Al peak position $D_{Al}$ was found. The found Al peak position $D_{Al}$ is shown in Table 3.

Al Oxide Perimeters Sum Measurement Test

The sum of perimeters of Al oxides was found by glow discharge under the same conditions as the above "Al peak position $D_{Al}$ measurement test" using a glow discharge optical emission analysis apparatus down to the Al peak position $D_{Al}$ and examining any 36 μm×50 μm region (observed region) in the discharge marks at the Al peak position $D_{Al}$ by elemental analysis under the later explained conditions using an energy dispersive type X-ray spectroscope (EDS). The Al oxides in the observed region were identified (regions in which the intensity of the characteristic X-rays of O is 50% or more with respect to the maximum intensity of the characteristic X-rays of O in the observed region of the oxides are identified as oxides and in the regions of the identified oxides, the regions in which the intensity of the characteristic X-rays of Al is 30% or more with respect to the maximum intensity of the characteristic X-rays of Al in the observed region of the oxides are identified as Al oxides) and the sum of perimeters of the identified Al oxides (m/m²) were found.

EDS Elemental Analysis Conditions
　Apparatus: Scan type electron microscope (made by JEOL, Model No. "JSM-6610LA")
　EDS detector: JED-2300
　Accelerating voltage: 15 kV
　Beam current: 11.32057 nA
　Input count: 30000 cps or more
　Measurement time: 1000 seconds or more
　The sum of perimeters of Al oxides is shown in Table 3.

Number Density ND Measurement Test of Al Oxides

For each of the grain-oriented electrical steel sheets of the numbered tests, the Al oxide number density ND at the Al peak position $D_{Al}$ (/μm²) was found by the following method. Glow discharge was performed under the same conditions as the above "Al peak position $D_{Al}$ measurement test" using a glow discharge optical emission analysis apparatus down to the Al peak position $D_{Al}$. Any 36 μm×50 μm region (observed region) in the discharge marks at the Al peak position $D_{Al}$ was analyzed for elements under conditions the same as the above "Al oxide perimeters sum measurement test" using an energy dispersive type X-ray spectroscope (EDS). The Al oxides in the observed region were identified (regions in which the intensity of the characteristic X-rays of O is 50% or more with respect to the maximum intensity of the characteristic X-rays of O in the observed region of the oxides are identified as oxides and in the regions of the identified oxides, the regions in which the intensity of the characteristic X-rays of Al is 30% or more with respect to the maximum intensity of the characteristic X-rays of Al in the observed region of the oxides are identified as Al oxides), the number of the identified Al oxides was counted, and the Al oxide number density ND (/m$^2$) was found as ND=number of identified Al oxides/area of observed region. The Al oxide number density ND found was shown in Table 3.

Magnetic Property Evaluation Test

Using the next method, the magnetic properties of each of the grain-oriented electrical steel sheets of the numbered tests were evaluated. Specifically, from each of the grain-oriented electrical steel sheet of the numbered tests, a sample of a rolling direction length of 300 mm×width 60 mm was taken. The sample was subjected to a magnetic field of 800 A/m to find the magnetic flux density B8. Table 3 shows the test results. In Table 3, a magnetic flux density of 1.92 T or more was indicated as "Excellent", 1.90 T to less than 1.92 T as "Good", 1.88 T to less than 1.90 T as "Fair", and less than 1.88 T as "Poor". If the magnetic flux density as 1.90 T or more (that is, if "Good" in Table 3), it was judged that the magnetic properties were excellent, while if it was 1.92 T or more (that is, "Excellent" in Table 3), it was judged that the magnetic properties were particularly excellent.

Adhesion Evaluation Test

Using the next method, the adhesion of the primary coating of each of the grain-oriented electrical steel sheets of the numbered tests was evaluated. Specifically, a sample of a rolling direction length of 60 mm×width 15 mm was taken from each of the grain-oriented electrical steel sheets of the numbered tests. The sample was subjected to a flex test by a curvature of 10 mm. The flex test was performed using a cylindrical mandrel flex testing machine (made by TP Giken) while setting it at the sample so that the axial direction of the cylinder matched the width direction of the sample. The surface of the sample after the flex test was examined and the total area of the regions where the primary coating remained without being peeled off was found. Specifically, the sample after the flex test was returned to the flat state and the surface appearance was captured by a scanner (made by EPSON, Model No. "ES-H7200"). The obtained image was digitalized by built-in software of the scanner and the area of locations where the primary coating remained in the sample surface was measured. Further, the remaining rate of the primary coating was found by remaining rate of the primary coating=total area of regions in which primary coating remains without being peeled off/area of flexed part in sample×100.

Table 3 shows the test results. A remaining rate of the primary coating of 90% or more was indicated as "Good", a rate of 70 to less than 90% as "Fair", and a rate of less than 70% as "Poor". If the remaining rate of the primary coating is 90% or more (that is, if "Good" in Table 3), it was judged that the adhesion of the primary coating with respect to the base steel sheet was excellent.

Test Results

Table 3 shows the test results.

The invention examples of Test Nos. 1 to 21 have chemical compositions of the annealing separators satisfying the chemical composition prescribed in one aspect of the present invention. Specifically, as the particle size distribution of MgO of the annealing separator, the content of particles with a particle size of 1.0 μm or less is 20 to 30% and the content of particles with a particle size of 10 μm or more is 2 to 5%, the content of the hydroxide, sulfate, or carbonate of Ca, Sr, or Ba is in a range of a total of 0.5 to 10.0% with respect to the content of MgO and X/([Ca]+[Sr]+[Ba]) satisfies a range of 0.80 to 1.00, the mean particle size of the hydroxide, sulfate, or carbonate of Ca, Sr, or Ba is 1.0 to 10.0 μm and the ratio of the mean particle size of the hydroxide, sulfate, or carbonate of Ca, Sr, or Ba with respect to the median size of MgO is 0.8 to 2.5, and, furthermore, the content of the Ti compound, Y compound, La compound, and Ce compound is a total of 1.0 to 15.0% with respect to the content of MgO.

For this reason, a peak position of Al emission intensity obtained when conducting elemental analysis by glow discharge spectrometry from a surface of the primary coating in a thickness direction of the grain-oriented electrical steel sheet is present in a range of 2.0 to 12.0 μm from a surface of the primary coating to the thickness direction, a sum of perimeters of the Al oxides at the peak position of the Al emission intensity is 0.20 to 1.00 μm/μm$^2$, and a number density of Al oxides is 0.02 to 0.20/m$^2$.

As a result, in Test Nos. 1 to 21, the primary coating exhibited excellent adhesion and exhibited excellent magnetic properties. Test Nos. 2 to 21 in which the hot rolled steel sheet contained Sb, Sn, Cu, Bi, Te, and Pb were particularly excellent in magnetic properties compared with Test No. 1.

As opposed to this, the comparative examples of Test Nos. 22 to 48 do not satisfy the conditions of one aspect of the present invention, so one or both of the adhesion of the primary coating or the magnetic properties were unsatisfactory.

In Test Nos. 22 to 24, the total content of the Ca, Sr, and Ba compounds was above the upper limit prescribed in one aspect of the present invention. For this reason, the Al peak position $D_{Al}$ and sum of perimeters of Al oxides were low and as a result the adhesion of the primary coating was low.

In Test Nos. 25 to 27, the total content of the Ca, Sr, and Ba compounds fell below the lower limit prescribed in one aspect of the present invention. For this reason, the sum of perimeters of Al oxides and the number density of Al oxides were low and as a result the adhesion of the primary coating was low. Further, the magnetic properties were also poor.

In Test No. 28, the total content of the Ti compound, Y compound, La compound, and Ce compound fell below the lower limit prescribed in one aspect of the present invention. For this reason, the Al peak position $D_{Al}$, the sum of perimeters of Al oxides, and the number density of Al oxides were low and as a result the adhesion of the primary coating was low.

In Test No. 29, X/([Ca]+[Sr]+[Ba]) fell below the lower limit prescribed in one aspect of the present invention, and the Al peak position $D_{Al}$, the sum of perimeters of Al oxides, and the number density of Al oxides were low. As a result, the adhesion of the primary coating was poor. Further, the magnetic properties were also poor.

In Test No. 30, the mean particle size of the Sr compound rose above the upper limit prescribed in one aspect of the present invention and the ratio with the median size of MgO also rose above the upper limit prescribed in one aspect of the present invention. As a result, the sum of perimeters of Al oxides was low and the adhesion of the primary coating was low.

In Test No. 31, the total content of the Ti compound, Y compound, La compound, and Ce compound rose above the upper limit prescribed in one aspect of the present invention. For this reason, the Al peak position $D_{Al}$, the sum of perimeters of Al oxides, and the number density of Al oxides were higher than the upper limit of one aspect of the present invention and as a result the magnetic properties were poor.

In Test No. 32, the mean particle size of the Ca compound rose above the upper limit prescribed in one aspect of the present invention and the ratio with the median size of MgO also rose above the upper limit prescribed in one aspect of the present invention. Furthermore, the total content of the Ti compound, Y compound, La compound, and Ce compound rose above the upper limit prescribed in one aspect of the present invention. For this reason, the Al peak position $D_{Al}$, the sum of perimeters of Al oxides, and the number density of Al oxides were higher than the upper limit of one aspect of the present invention and the magnetic properties were poor.

In Test No. 33, the mean particle size of the Sr compound fell below the lower limit prescribed in one aspect of the present invention and the ratio with the median size of MgO also fell below the lower limit prescribed in one aspect of the present invention. For this reason, the sum of perimeters of Al oxides and the number density of Al oxides fell below the lower limit of one aspect of the present invention and the adhesion was poor. Further, the magnetic properties were also poor.

In Test Nos. 34 to 36, in the particle size distribution of MgO, the particles with a particle size of 1.0 µm or less fell below the lower limit prescribed in one aspect of the present invention. In Test No. 35, furthermore, the mean particle size of the Ca compound rose above the upper limit prescribed in one aspect of the present invention while the ratio with the median size of MgO also rose above the upper limit prescribed in one aspect of the present invention. Further, in Test No. 36, furthermore, the mean particle size of the Sr compound fell below the lower limit prescribed in one aspect of the present invention and the ratio with the median size of MgO also fell below the lower limit prescribed in one aspect of the present invention. For this reason, in Test Nos. 34 to 36, the Al peak position $D_{Al}$, the sum of perimeters of Al oxides, and the number density of Al oxides fell below the lower limit prescribed in one aspect of the present invention and the adhesion was poor.

In Test Nos. 37 to 39, in the particle size distribution of MgO, the particles with a particle size of 1.0 µm or less rose above the upper limit prescribed in one aspect of the present invention. In Test No. 38, furthermore, the mean particle size of the Ca compound rose above the upper limit prescribed in one aspect of the present invention and the ratio with the median size of MgO also rose above the upper limit prescribed in the present invention. Further, in Test No. 39, furthermore, the mean particle size of the Sr compound fell below the lower limit prescribed in one aspect of the present invention and the ratio with the median size of MgO also fell below the lower limit prescribed in one aspect of the present invention. For this reason, in Test Nos. 37 to 39, the Al peak position $D_{Al}$, the sum of perimeters of Al oxides, and the number density of Al oxides were lower than the lower limit prescribed in one aspect of the present invention and the adhesion was poor.

In Test Nos. 40 to 42, in the particle size distribution of MgO, the particles with a particle size of 10 µm or more of fell below the lower limit prescribed in one aspect of the present invention. In Test No. 41, furthermore, the mean particle size of the Ca compound rose above the upper limit prescribed in one aspect of the present invention and the ratio with the median size of MgO also rose above the upper limit prescribed in one aspect of the present invention. Further, in Test No. 42, furthermore the mean particle size of the Sr compound fell below the lower limit prescribed in one aspect of the present invention and the ratio with the median size of MgO also fell below the lower limit prescribed in one aspect of the present invention. For this reason, in Test Nos. 40 to 42, the Al peak position $D_{Al}$, the sum of perimeters of Al oxides, and the number density of Al oxides were lower than the lower limit prescribed in one aspect of the present invention and the adhesion was poor.

In Test Nos. 43 to 45, in the particle size distribution of MgO, the particles with a particle size of 10 µm or more rose above the upper limit prescribed in one aspect of the present invention. In Test No. 44, furthermore, the mean particle size of the Ca compound rose above the upper limit prescribed in one aspect of the present invention and the ratio with the median size of MgO also rose above the upper limit prescribed in one aspect of the present invention. Further, in Test No. 45, furthermore, the mean particle size of the Sr compound fell below the lower limit prescribed in one aspect of the present invention and the ratio with the median size of MgO also fell below the lower limit prescribed in one aspect of the present invention. For this reason, in Test Nos. 43 to 45, the Al peak position $D_{Al}$, the sum of perimeters of Al oxides, and number density of Al oxides were lower than the lower limit prescribed in one aspect of the present invention and the adhesion was poor.

Test Nos. 46 to 48 respectively differ in only the ratio of the mean particle size of Ca, Sr, or Ba and the median size of MgO with respect to those of Test Nos. 5, 15, and 21. In Test No. 46, the ratio of the mean particle size of Ca and the median size of MgO, in Test No. 47, the ratio of the mean particle size of Sr and the median size of MgO, and in Test No. 48, the ratio of the mean particle size of Ba and the median size of MgO respectively rose above the upper limits prescribed in one aspect of the present invention. For this reason, in Test Nos. 46 to 48, the Al peak position $D_{Al}$, the sum of perimeters of Al oxides, and number density of Al oxides were lower than the lower limits prescribed in one aspect of the present invention and the adhesion was poor.

The invention claimed is:

1. An annealing separator having MgO as a main constituent, wherein
    the annealing separator contains at least one of a hydroxide, sulfate, or carbonate of Ca, Sr, or Ba and at least one of a Ti compound, Y compound, La compound, or Ce compound,
    when a content of the MgO in the annealing separator is defined as 100% by mass %, 20 mass % to 30 mass % of the MgO particles have a particle size of 1.0 µm or less and 2 mass % to 5 mass % of the MgO particles have a particle size of 10 µm or more,
    a hydroxide, sulfate, or carbonate of Ca, Sr, or Ba is contained in a range of a total of 0.5 to 10.0 mass % with respect to a content of MgO and [Ca], [Sr], and [Ba], satisfy a range of 0.80 to 1.00 of X/([Ca]+[Sr]+[Ba]), where
        [Ca] represents a total value of a respective content of the hydroxide, sulfate, and carbonate of Ca contained in the annealing separator with respect to the content of MgO divided by molecular weights of the hydroxide, sulfate, and carbonate of Ca, respectively,
        [Sr] represents a total value of a respective content of the hydroxide, sulfate, and carbonate of Sr contained in the annealing separator with respect to the content of MgO divided by molecular weights of the hydroxide, sulfate, and carbonate of Sr, respectively,
        [Ba] represents a total value of a respective content of the hydroxide, sulfate, and carbonate of Ba contained in the annealing separator with respect to the content of MgO divided by molecular weights of the hydroxide, sulfate, and carbonate of Ba, respectively, and X represents the highest value among the [Ca], [Sr], or [Ba], a mean particle size of the hydroxide, sulfate, or carbonate of Ca, Sr, or Ba is 1.0 to 10.0 μm and a ratio of a mean particle size of the hydroxide, sulfate, or carbonate of Ca, Sr, or Ba to a median size of MgO is 0.8 to 2.5, and when a content of the MgO in the annealing separator is defined as 100% by mass %, a total content of the Ti compound, Y compound, La compound, and Ce compound is 1.0 to 15.0 mass %.

2. The annealing separator according to claim 1, wherein a mean particle size of a hydroxide, sulfate, or carbonate of an element with the highest content in the hydroxide, sulfate, or carbonate of Ca, Sr, or Ba is 1.0 to 10.0 μm.

\* \* \* \* \*